(12) United States Patent
Winter

(10) Patent No.: US 9,212,778 B2
(45) Date of Patent: Dec. 15, 2015

(54) APPARATUS AND METHOD FOR POSITIONING CONNECTION EQUIPMENT ON A DRILLING RIG

(71) Applicant: National Oilwell Varco, L.P., Houston, TX (US)

(72) Inventor: Brian Daniel Winter, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 376 days.

(21) Appl. No.: 13/715,748

(22) Filed: Dec. 14, 2012

(65) Prior Publication Data
US 2013/0168516 A1 Jul. 4, 2013

(30) Foreign Application Priority Data
Jan. 4, 2012 (GB) .................................. 1200047.7

(51) Int. Cl.
*E21B 19/16* (2006.01)
*F16M 13/02* (2006.01)
*F15B 15/14* (2006.01)
*F15B 11/13* (2006.01)

(52) U.S. Cl.
CPC ............ *F16M 13/022* (2013.01); *E21B 19/165* (2013.01); *F15B 11/13* (2013.01); *F15B 15/1423* (2013.01)

(58) Field of Classification Search
CPC ....... E21B 19/163; E21B 19/65; E21B 19/16; E21B 19/165; F16M 13/02; F16M 13/022; F15B 15/14; F15B 15/1423; F15B 11/13
See application file for complete search history.

(56) References Cited

U.S. PATENT DOCUMENTS

| | | | |
|---|---|---|---|
| 3,036,598 A * | 5/1962 | Smith et al. | 137/596.16 |
| 3,353,352 A * | 11/1967 | Gardner | 60/414 |
| 4,023,449 A | 5/1977 | Boyadjieff | |
| 4,234,150 A | 11/1980 | Mee et al. | |
| 4,274,778 A | 6/1981 | Putnam et al. | |
| 4,345,864 A | 8/1982 | Smith, Jr. et al. | |
| 4,348,920 A | 9/1982 | Boyadjieff | |
| 4,548,544 A | 10/1985 | Appledorn | |
| 4,715,761 A | 12/1987 | Berry et al. | |
| 4,725,179 A | 2/1988 | Woolslayer et al. | |
| 4,727,781 A * | 3/1988 | Yuehui et al. | 81/57.34 |
| 4,765,401 A | 8/1988 | Boyadjieff | |
| 4,843,945 A | 7/1989 | Dinsdale | |

(Continued)

FOREIGN PATENT DOCUMENTS

| | | |
|---|---|---|
| GB | 2480021 B | 2/2012 |
| WO | 2005024169 B | 3/2005 |

OTHER PUBLICATIONS

StarRacker TM (SR) with Integrated Iron Roughneck, National Oilwell; 2002, 2 pages.

(Continued)

*Primary Examiner* — Yong-Suk (Philip) Ro
(74) *Attorney, Agent, or Firm* — JL Salazar Law Firm

(57) ABSTRACT

A positioning apparatus for moving connection equipment on a drilling rig is disclosed. The positioning apparatus includes a piston and cylinder having a cylinder, a piston and a piston rod. The piston and piston rod are moveable relative to the cylinder (601) from a retracted position to an extended position. The positioning apparatus further includes a transfer barrier linked to the piston and cylinder for setting a maximum extension of said piston rod.

16 Claims, 14 Drawing Sheets

(56) References Cited

U.S. PATENT DOCUMENTS

| | | |
|---|---|---|
| 4,975,016 A | 12/1990 | Pellenc et al. |
| 5,049,020 A | 9/1991 | McArthur |
| 5,667,026 A | 9/1997 | Lorenz et al. |
| 5,782,162 A * | 7/1998 | Lanteigne et al. ............... 92/168 |
| 5,842,390 A | 12/1998 | Bouligny et al. |
| 6,142,041 A | 11/2000 | Buck |
| 6,253,845 B1 | 7/2001 | Belik |
| 6,263,763 B1 | 7/2001 | Feigel, Jr. et al. |
| 6,318,214 B1 | 11/2001 | Buck |
| 6,334,376 B1 | 1/2002 | Torres |
| 6,367,094 B1 * | 4/2002 | Gagliano ........................... 4/312 |
| 6,715,569 B1 | 4/2004 | Rogers |
| 6,776,070 B1 | 8/2004 | Mason et al. |
| 7,178,612 B2 | 2/2007 | Belik |
| 7,249,639 B2 | 7/2007 | Belik |
| 7,313,986 B2 | 1/2008 | West et al. |
| 7,387,050 B2 | 6/2008 | Slettedal et al. |
| 7,455,128 B2 | 11/2008 | Belik |
| 7,559,360 B2 | 7/2009 | Hobgood |
| 7,841,415 B2 | 11/2010 | Winter |
| 2004/0216906 A1 | 11/2004 | Rogers |
| 2005/0047884 A1 | 3/2005 | Belik |
| 2006/0118335 A1 | 6/2006 | Belik |
| 2006/0169132 A1 * | 8/2006 | Tucker ................................. 92/8 |
| 2007/0193750 A1 | 8/2007 | Wright et al. |
| 2007/0251728 A1 | 11/2007 | Belik |
| 2008/0011470 A1 | 1/2008 | Hobgood |
| 2008/0217067 A1 | 9/2008 | Ge |
| 2008/0257607 A1 * | 10/2008 | Winter .......................... 175/162 |
| 2009/0065189 A1 | 3/2009 | Hobgood |
| 2012/0201632 A1 | 8/2012 | Yater et al. |

OTHER PUBLICATIONS

Hydraulic Roughneck, Maritime Hydraulics, General Catalogue 1993-1994, 3 pages.
GB Search Report from counterpart GB Patent Application No. GB120004.7 dated Jan. 31, 2012, 4 pages.
"Star Racker (TM) (SR) with Integrated Iron Roughneck", National Oilwell, 2002, 2 pages.
"Hydraulic Roughneck", Maritime Hydraulics 1993-1994, 1993, 3 pages.
"Compact, Portable and Powerful Iron Roughneck for All Rig Types", Varco Systems, (2003), 2 pages.
"Iron Roughneck IR-3080", National Oilwell, (2001), 6 pages.

* cited by examiner

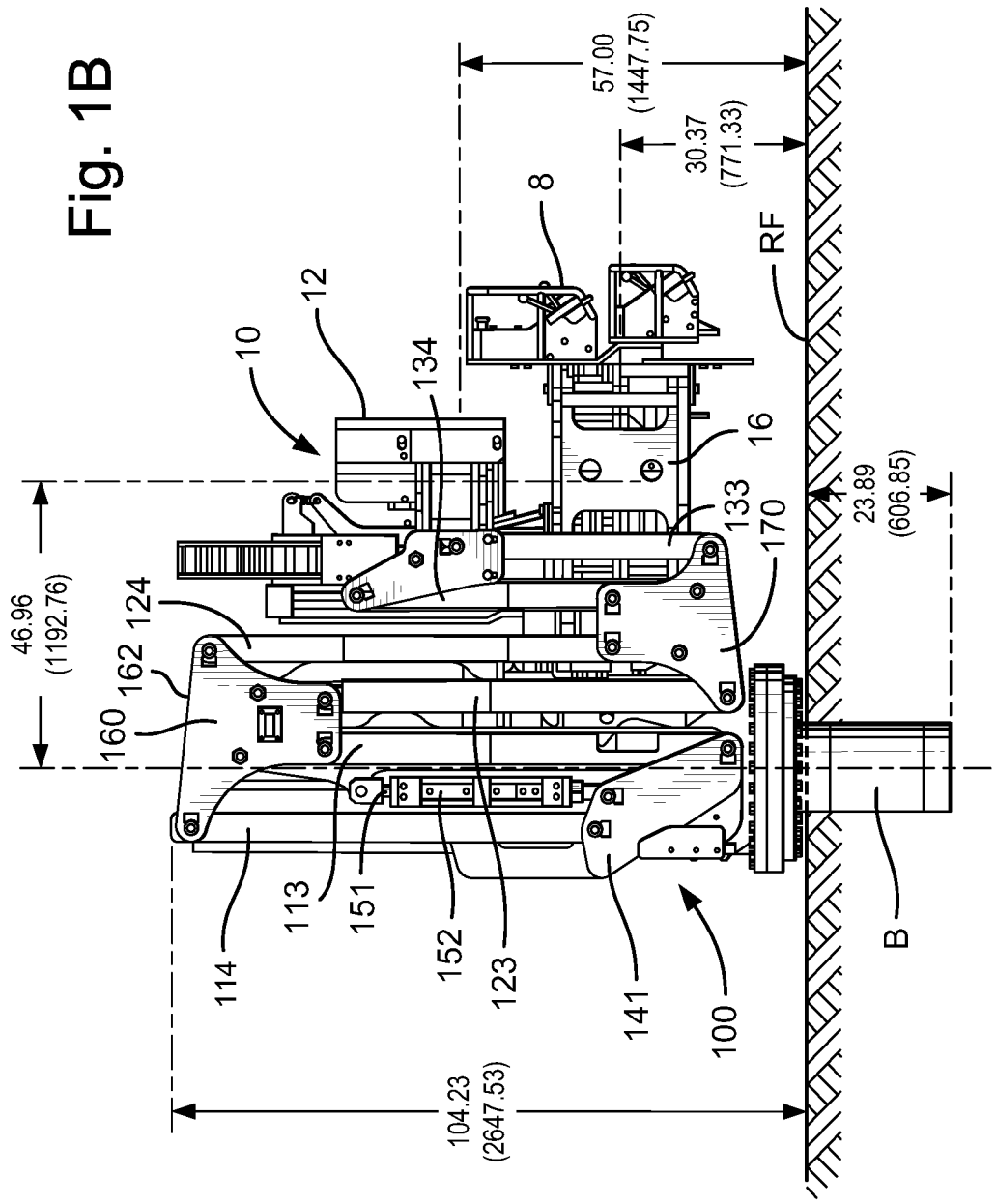

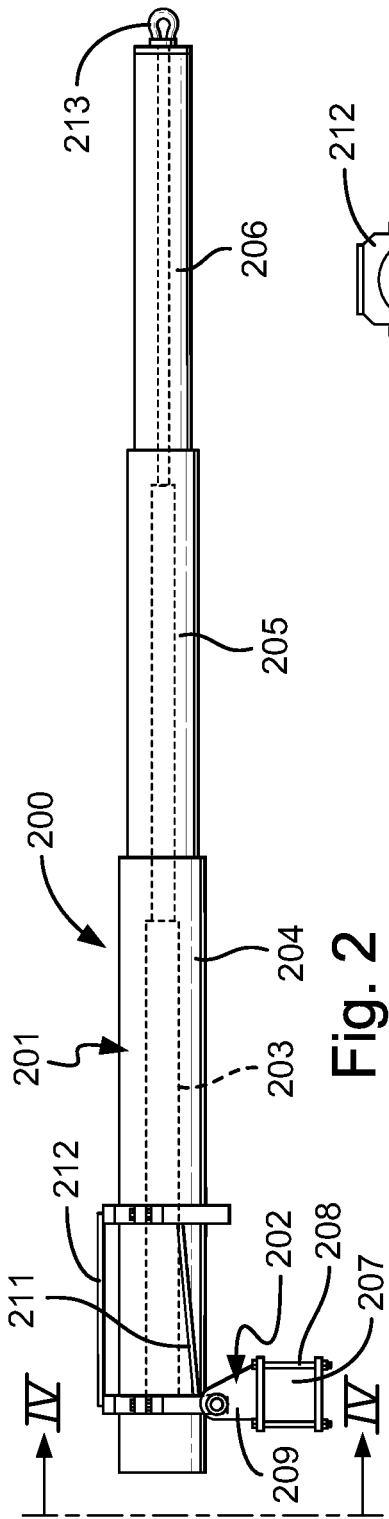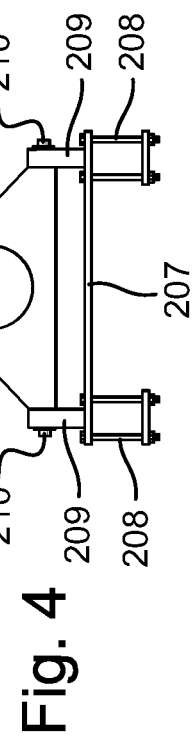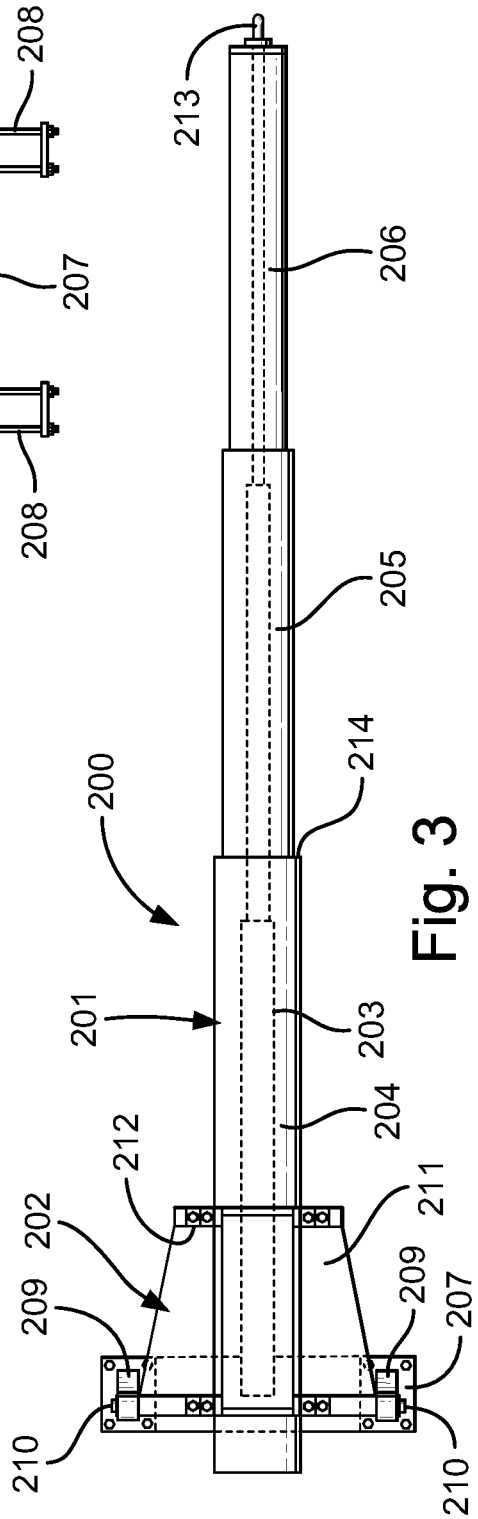

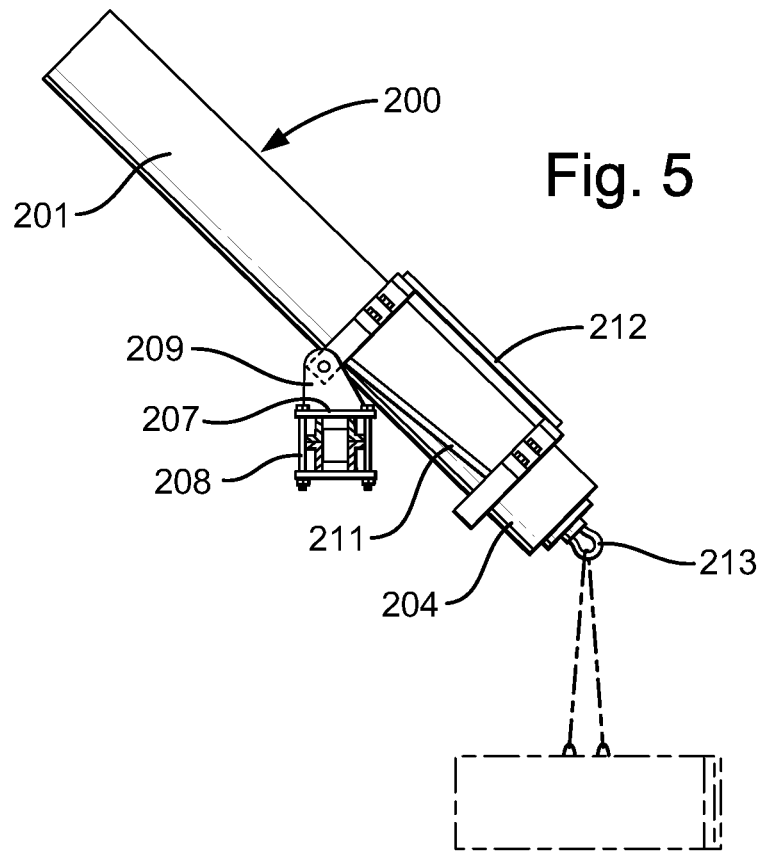
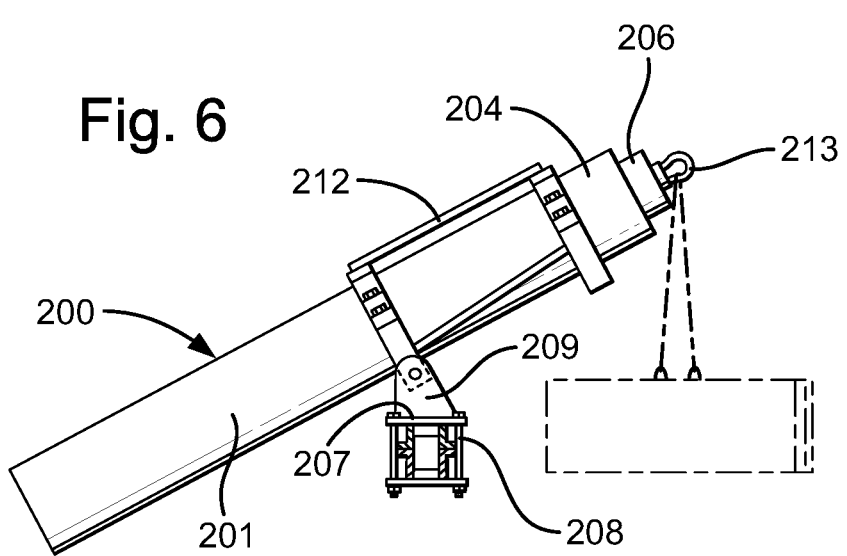

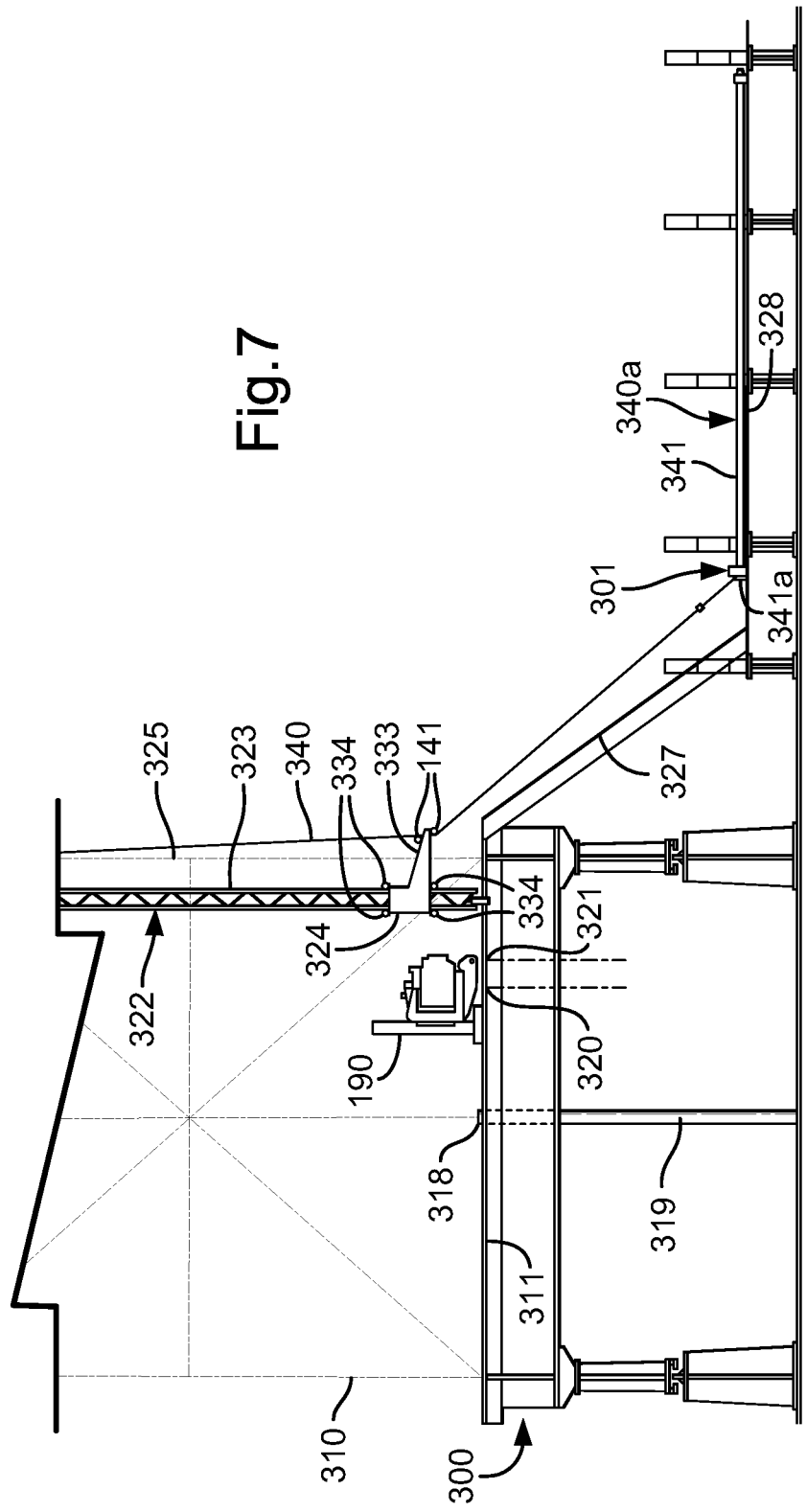

APPARATUS AND METHOD FOR POSITIONING CONNECTION EQUIPMENT ON A DRILLING RIG

BACKGROUND

The present invention relates to apparatus and method for positioning connection equipment on a drilling rig. Such connection equipment may be, but not limited to a power tong, spinner or iron roughneck.

In the drilling of a borehole in the formation of an oil or gas well, a drill bit is arranged on the end of a drill string and is rotated to bore the borehole. The drill string comprises a string of tubulars known as drill pipe sections. A drill pipe section comprises an upper and lower end. The upper end is provided with an enlarged section having a female thread, known as the box end; and the lower end is provided with an upstand and a male thread, known as the pin end. Sections of drill pipe are connected into stands of two or three sections. This may be carried out away from well center using a mousehole or rat-hole located in a floor of a drilling rig platform. Once a stand of drill pipe has been constructed, the stand is moved from the mouse-hole or rat-hole and stored in a rack. The stands are then moved from the rack to well center and connected to a string of drill pipe in the well.

To accomplish the connection between drill pipe, whether in the form of a section, stand or string, was carried out with two tools: a spinner; and a torque wrench. For example, a pin of an upper section of drill pipe is lowered into the box of a lower section retained in a mouse-hole. The spinner spins the upper section of drill pipe threading the pin end into the box. The spinner is then removed and the torque wrench is offered up to the upper section of drill pipe. The torque wrench comprises a power tong to rotate the upper section of drill pipe and a back-up tong to inhibit reaction rotation of the lower section of drill pipe retained in the mousehole. The back-up tong is used during torquing and may also be used during spinning. The tong is activated to rotate the drill pipe section or stand and torque the connection to a required torque, typically less than one rotation. The torque wrench and back-up tong are then removed from the drill pipe. An apparatus known as an iron roughneck, combines a spinner with a tong and back-up tong and may also comprise a form of stabbing guide to ensure alignment of the pin and box.

In certain types of joint, upon torquing, a face of the upstand known as the "shoulder" and a face of the box meet and there is a sharp rise in torque required to turn the upper drill pipe relative to the lower. This type of joint normally requires less than forty-five degrees of turn for the torquing step after the spinning step. However, some connections do not have shoulders and are continuous threads, such as Hydril Wedge Thread type connections. Such connection generally require more than a quarter turn of torquing.

During work over of a well, a string of pipe is lowered into the well in much the same way as for the drill string. However, the string is sometimes referred to as a tool string rather than a drill string.

Other tubulars are used in the construction and maintenance of an oil or gas well, such as casing. Casing is usually screwed in single sections at the well center and lowered into the well. The casing is then hung from the top of the well and may be cemented in place. Other tubulars known as liner is screwed together and lowered into the well. The liner is hung from the bottom of a section of casing and may be cemented in place. A power tong or iron roughneck may be used to facilitate connection of these tubulars. Such tubulars often have threaded connections and require the use of iron roughnecks, power tongs and spinners to perfect the connections.

Downhole tools may also be connected into any of a: drill string; tool string; casing; or liner. These downhole tools may be connected with screwed threads and thus require spinning and torquing.

The above described method for spinning and torquing can be applied to any of the tubulars with screw threaded connection as described above.

"Iron roughnecks" combine a torque wrench and a spinning wrench to connect and disconnect tubulars, e.g. drilling components, such as drill pipe, in running a string of tubulars into or out of a well. Prior art tong systems and iron roughnecks are shown. e.g., in U.S. Pat. Nos. 4,023,449; 4,348,920; 4,765,401; 6,318,214; 6,776,070; 7,249,639; and 7,313,986 all of which are incorporated herein by reference in their entirety.

Various prior art iron roughnecks have a spinning wrench and a torque wrench mounted together on a carriage. For making or breaking threaded connections between two tubulars, for example joints of drill pipe, certain iron roughnecks have a torque wrench with two jaw levels. An upper jaw of the torque wrench is used to clamp onto a portion of an upper tubular, and a lower jaw clamps onto a portion of a lower tubular, for example upper and lower threadedly connected pieces of drill pipe. After clamping onto the connected tubulars, the upper and lower jaws are turned relative to each other to break a connection between the upper and lower tubulars. A spinning wrench, mounted on the carriage above the torque wrench, engages the upper tubular and spins it until it is disconnected from the lower tubular.

Certain prior art iron roughneck systems include a carriage for rolling on the surface of the rig floor along a predetermined path. In certain prior art systems a spinner and torque wrench are mounted for upward and downward movement relative to a carriage, for proper engagement with tubulars, and for tilting movement between a position in which their axis extends directly vertically for engagement with a vertical well pipe and a position in which the axis of the spinner and torque wrench is disposed at a slight angle to true vertical to engage and act against a pipe in an inclined mousehole. In certain prior art systems, a spinner is movable vertically with respect to a torque wrench.

Certain iron roughnecks are mounted on an extendable and retractable support structure for movement to and from a wellbore center without interfering with or blocking performance of other operations relative to the well and rotating or driving apparatuses.

U.S. Pat. No. 7,249,639, co-owned with the present invention, discloses an apparatus for moving an Iron Roughneck into position to allow making-up or breaking-out of threaded joints in a drill string. The apparatus may also be used to move other drilling equipment into position on the centerline of the well or at mouseholes. A self-balanced, dual synchronized parallelogram arm is utilized to accomplish the movement of the devices. Hydraulic or pneumatic cylinders are used for extension and retraction of the arm rather than to support the tool. The arm may hold the tool in any position without cylinder assistance. The linkage in the synchronized parallelogram may be accomplished by gears, links, slots, or rollers. In certain aspects, an apparatus is disclosed for moving drilling equipment having: a column attached to a drill floor; a column guide attached to the column; at least one parallelogram arm attached to the column guide at a first connection point, the at least one parallelogram arm comprising a tension link, a lower support arm, an upper support arm, a compression link, and a load transfer joint; a drilling apparatus attached to the parallelogram arm at a second connection point; and a cylinder attached to the column guide for raising and/or lowering the column guide along the column.

U.S. Patent 7,313,986, co owned with the present invention, discloses a system with a torque wrench and a spinning wrench on a carriage which is movably connected for up/down vertical movement to a column and which can also translate horizontally on a rig floor for movement toward and awmay from a drill pipe of a drill string in a well. Support arms are pivotably connected at one end to a base of the carriage and at their other ends to a support. Optionally, only one support arm is used or two arms in parallel are used. A connector is removably emplaceable in a socket to mount the system on a rig. In one particular aspect the dual arms move the spinner/wrench combination outwardly 24" (60.96cm) from the column which results in a 6.5" (16.51cm) rise vertically. The wrenches are movable by a power mechanism toward and away from the column 14 by moving the support arms. The spinning wrench is movable up and down on the carriage toward and away from the torque wrench. A control console for the communicates by wire or wirelessly with the system components and can be located remotely.

US 2005/004788Belik and US 2005/024169Lechtenberger disclose a positioning system for an Iron Roughneck, the positioning system comprising column guide arranged on a column spaced from well center and mousehole. A self-balanced, dual synchronized parallelogram arm is suspended from the column guide and is retractable and extendable therefrom. Hydraulic or pneumatic cylinders are used to extend and retract the arm. Synchronization is accomplished with gears, links, slots or rollers. The hydraulic or pneumatic piston is used to extend and retract the arm from a vertical storage position to various distances therefrom. A plurality of mechanical stops may be used to control the extension of the arm from the column for different distances therefrom, such as to the well center and mousehole. The mechanical stop is arranged between a member of the arm and the column guide. A sensor of a PLC is used in controlling the height of the column guide on the column.

The inventor has noted that distances between the well-center and the column on which the Iron Roughneck positioning apparatus is mounted is rarely the same as the distance between the mouse-hole and the column on which the Iron Roughneck positioning apparatus is mounted. Operators rely on eye to position the Iron Roughneck at well-center or at the mouse-hole. The inventor has noted a need for an apparatus and a method of improving speed and accuracy of aligning the connection equipment, such as an Iron Roughneck, power tong, spinner etc. with a tubular in a mouse-hole, rat hole, at well center and at other locations of use. The inventor has noted that the connection equipment is used at one location for a large number of operations. For example, an iron roughneck will be used at the mouse-hole to construct dozens of stands of drill pipe and then will be used at well center to connect dozens of stands of tubulars to the drill string. He has also noted that connection equipment will be used continuously at well center connecting sections of casing. The inventor has noted that connection apparatus is rarely swung randomly between well-center and mouse-hole, or between a further mouse-hole, rat-hole, tool connection area etc.

SUMMARY

In accordance with the present invention, there is provided a positioning apparatus for moving connection equipment on a drilling rig, the positioning apparatus comprising a piston and cylinder having a cylinder, a piston and a piston rod, the piston and piston rod moveable relative to the cylinder from a retracted position to an extended position, the positioning apparatus further comprising a transfer barrier linked to the piston and cylinder for setting a maximum extension of said piston rod.

Preferably, one transfer barrier may be used for one, two three, four or more piston and cylinders.

The piston and piston rod may be integral, formed of the same piece of material, such as milled from a single piece of metal, such as steel, or may be formed from two separate pieces and connected together, by for example a pin arranged through aligned holes in the piston head and an end of the piston rod. Preferably, the piston and cylinder is single acting. Advantageously, the piston and cylinder is double acting.

Preferably, the transfer barrier comprises a moveable member to create a maximum extension lock to limit the movement of the positioning apparatus.

Preferably, the piston and cylinder further comprises a first cylinder head and the cylinder has a bore, a first chamber defined by the first cylinder head, the bore and the piston, and a flow path between the first chamber C and the transfer barrier to provide fluid communication therebetween. In a preferred embodiment, the cylinder is attached to a mount on a part of the derrick or on a column fixed to a drilling rig floor. The piston is preferably extendible from the cylinder away from the mount to extend an arm of the positioning apparatus. However, the piston and cylinder may be installed in the positioning apparatus such that upon extension of the piston rod, the arm will retract and upon retraction of the piston rod, the arm will extend. In such an arrangement, a chamber formed on the opposite side of the piston side would be in fluid communication with the transfer barrier. Advantageously, the first chamber C is also defined by the piston rod.

Preferably, the cylinder has a second cylinder head, a second chamber defined by the second cylinder head, the bore and the piston head, and a power fluid flow line to provide fluid under pressure to move the piston. Preferably, the fluid flow line is provided with hydraulic fluid via a pump driven by a motor, which may be hydraulic, pneumatic or electrically driven.

Advantageously, the positioning apparatus further comprises a load holding valve for selectively retaining fluid in the first chamber C. Preferably, the positioning apparatus further comprises a load holding valve for selectively retaining fluid in the second chamber D. Preferably, the load holding valve is in fluid communication with the chamber C and/or D in the piston and cylinder. Advantageously, the load holding valve retains fluid in the chamber C and/or D when hydraulic fluid pressure in the flow lines feeding the chambers reduces to below that in the chamber. Preferably, the load holding valve is arranged on or in the piston and cylinder. The load holding valve opens when fluid pressure in the flow lines is above the pressure in chamber and/or is sufficient to overcome a spring arranged behind a slide valve of the load holding valve to move the slide valve to allow flow of fluid between the chamber and the flow line.

Preferably, the positioning apparatus further comprises a deploy control valve for selectively providing fluid to the power fluid flow line for providing fluid to the second chamber. Preferably, the deploy control valve has three positions: a RETRACT, an EXTEND and a NEUTRAL position. Advantageously, the control has a self-centring mechanism such that the control returns to NEUTRAL.

Advantageously, the transfer barrier comprises a free floating piston slideably arranged in a transfer barrier cylinder. Preferably, the free floating piston has at least one sealing ring for providing a fluid tight seal between the free floating piston and a bore of the transfer barrier cylinder. Advantageously, the transfer barrier further comprises a first cylinder head, the transfer barrier cylinder having a bore and a first transfer barrier chamber B defined by the first cylinder head, the free floating piston, and the transfer barrier cylinder bore, the first transfer barrier chamber B in fluid communication with the flow path. Preferably, the positioning apparatus further comprises a power fluid flow path for providing the first transfer barrier chamber B with fluid. Preferably, the power fluid flow line is provided with hydraulic fluid via a pump driven by a motor, which may be hydraulic, pneumatic or electrically driven and may be the same pump as used for supplying chambers A, C and D.

Preferably, the positioning apparatus further comprises a slide valve in the power fluid flow path to selectively inhibit flow of fluid therealong. The slide valve may allow fluid to enter the Chamber B when fluid under pressure is supplied through the adjust control valve to overcome spring force holding the slide valve in a closed position. The slide valve may also allow fluid to drain from chamber B upon an adjust control valve moved to an EXTEND TO SET position, allowing pressure to be applied to the slide valve to overcome a spring holding the slide valve closed.

Advantageously, the positioning apparatus further comprises an adjust control valve for selectively providing fluid to the power fluid flow path for providing fluid to the first transfer barrier chamber B. Preferably, the adjust control valve has three positions: a RETRACT TO RESET, an EXTEND TO SET and a NEUTRAL position. Advantageously, the control has a self-centring mechanism such that the control returns to NEUTRAL. Alternatively, the control valve may have two or four settings.

Preferably, the transfer barrier further comprises a second cylinder head, a second transfer barrier chamber A defined by the second cylinder head, the free floating piston, and the transfer barrier cylinder bore, and a power flow path for selectively supplying fluid thereto and draining therefrom. Preferably, the flow of fluid through the power flow path is selectively controlled by deploy control valve. Preferably, when the deploy control valve is set to RETRACT, fluid is allowed to flow through the power flow path to the Chamber A. preferably, when the deploy control valve is set to EXTEND or NEUTRAL, fluid is allowed to drain from the Chamber A through the power flow path to tank.

Preferably, the fluid is hydraulic fluid, which can be used in combination with the free floating piston to create a hydraulic lock in the transfer cylinder at the set position. The fluid in the piston and cylinders and/or transfer barrier is preferably hydraulic, however it may be pneumatic or a combination of hydraulic and pneumatic using accumulators.

Preferably, the positioning apparatus comprises one of: a foldable arm; and a telescopic arm.

Preferably, the deploy control valve and/or the adjust control valve is/are operated remotely by control sticks, such as a lever or joystick. The remote controls may be linked to the deploy control valve and/or the adjust control valve by a hydraulic line, a pneumatic line or by electrical cables and stepper motors or the like to move the control valves between settings.

The tubulars to be connected by the connection equipment can be any of: drill pipe; tool pipe; casing; liner, perforated liner, or any other kind of pipe which would be used downhole, including threaded connections on downhole tools and down Bottom Hole Assemblies or any other downhole tool which may be connected with screwed threads and thus require spinning and torqueing.]

The present invention also provides a method for positioning connection equipment for connecting tubulars and moving the positioning equipment therefrom using the apparatus as claimed in any preceding claim, the method comprising the step of setting the transfer barrier at a setpoint when the connection equipment is in position for connecting tubulars.

The present invention also provides a method for positioning connection equipment using a positioning apparatus for connecting tubulars and moving the positioning equipment therefrom, the method comprising the steps of moving a deploy control device and an adjust control device, preferably, simultaneously although not necessarily, to an EXTEND and an EXTEND TO SET position respectively until the connection equipment is at a point at which tubulars can be connected therewith, and releasing at least the adjust control device to set position at which the connection equipment will be used to connect tubulars.

Preferably, the adjust control device is an adjust control lever knob, push switch, on screen computer representation thereof or like. and the deploy control device is a deploy control lever, knob, push switch, on screen computer representation thereof or like Preferably, the method further comprises the step of moving the deploy control device repeatedly from a RETRACT to EXTEND position to move the connection equipment, such that the connection equipment is inhibited from moving further than the set position. Advantageously, the method further comprises the step of moving the adjust control device in a RETRACT TO RESET position to move the connection equipment to a fully retracted storage and to reset the set position preferably, allowing the positioning apparatus to extend to maximum extension.

BRIEF DESCRIPTION OF THE DRAWING

For a better understanding of the present invention, reference will now be made, by way of example, to the accompanying drawings, in which:

FIG. 1B is a side view of the apparatus shown in FIG. 1A, shown in a retracted position;

FIG. 2 is a side elevation of an apparatus in accordance with the present invention in an operative position;

FIG. 3 is a top plan view of the apparatus shown in FIG. 2;

FIG. 4 is an end view taken on line of FIG. 2;

FIG. 5 is a perspective view showing the apparatus connected to a tong with the apparatus in a first inoperative position;

FIG. 6 is a perspective view showing the arrangement of FIG. 4 with the apparatus in a second inoperative position;

FIG. 7 is a schematic diagram of a side view of parts of a drilling rig of the invention incorporating an apparatus of the present invention, showing a first step in a method in accordance with the present invention;

FIG. 10E shows the hydraulic circuit shown in FIG. 10A with the piston and piston rod thereof in at the partially extended at which connection equipment held by the apparatus is noted by the operator to be in position at well-center, the operator having released the deploy lever and the floating piston remaining bottomed out in the transfer barrier cylinder; shows the hydraulic circuit shown in FIG. 10A with the piston and piston rod thereof in a partially extended position and the floating piston bottomed out in a transfer barrier cylinder of the transfer barrier.

DETAILED DESCRIPTION

Figure 1A:
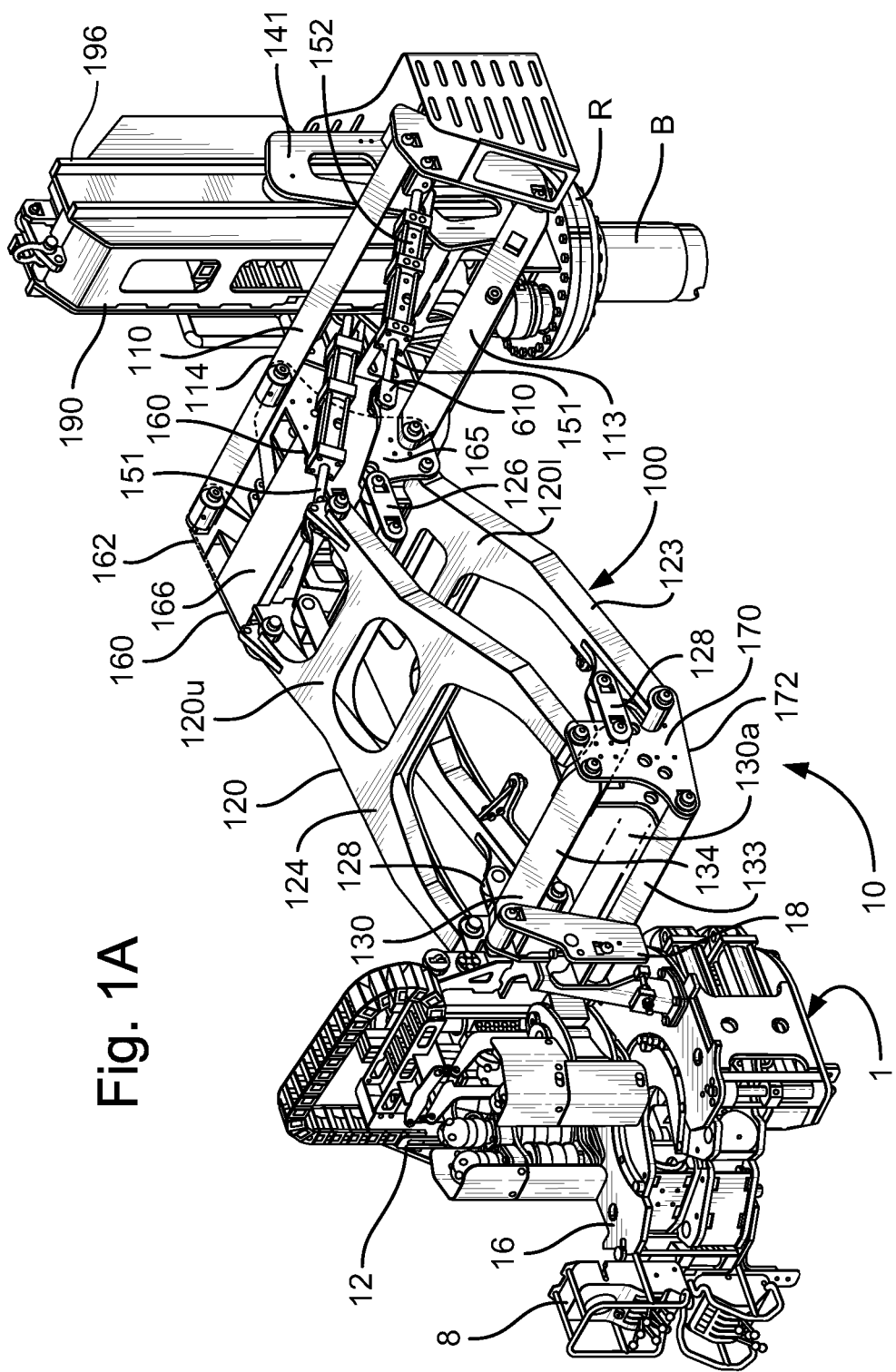
FIG. 1A is a perspective view of an apparatus in accordance with the present invention, shown in an extended position.

FIG. 1A shows an apparatus 10 in accordance with the present invention having an iron roughneck 1 on a distal end of a positioning apparatus 100. The iron roughneck 1 comprises a spinner 12 and a wrench 16 movably mounted on to a support 18. The spinner 12 may be any suitable spinner to rotate a tubular to facilitate connection or disconnection of threaded pipes. The wrench 16 may be any suitable wrench for torquing connections between threaded pipes to make a connection or used to break a connection. In one particular aspect, the spinner 12 is like a spinning wrench disclosed in U.S. Ser. No. 12/072,296 and published in PCT Publication No. WO 2008/107712 (co-owned with the present invention and incorporated fully herein for all purposes) and the wrench 16 is a torque wrench as disclosed in U.S. Pat. No. 7,313,586 (co-owned with the present invention and incorporated fully herein for all purposes). A control panel 8 controls the spinner 12, the wrench 16, and the apparatus 100. Alternatively or additionally, the control panel 8 may be located in a driller's cabin (not shown).

The extension apparatus 100 as shown in FIG. 1A has three pivotable interconnected linkage sections 110, 120, 130 providing for extension and retraction of the spinner 12 wrench 16 combination. It is within the scope of this invention for the apparatus to have only one, two or more than three pivotable linkage sections. The linkage section 130 is connected to the support 18.

Each linkage section has pivotable upper and lower members which form an extendible/retractable parallelogram structure. The linkage 110 has lower arms 113 and upper arms 114. Lower arm ends are pivotably connected to a mount 141 and upper arm ends are pivotably connected to a connection 160. The connection 160 includes spaced apart side plates 162, 164; connection members 165 (see FIG. 1L); and cross structure 166. The arms 113 each have an end pivotably connected to a connection member 165. During movement, the arms 113 move parallel to the arms 114.

The linkage 120 has a lower part 120l with lower arms 123 and an upper part 120u with upper arms 124. Two ends of the lower part 120l and of the upper part 120u are pivotably connected to the connection 160 and two opposing ends of each arm 123, 124 are pivotably connected to a connection 170. Links 126 each have a first end pivotably connected to the upper part 120u and a second end pivotably connected to a connection member 165. Links 128 each have a first end pivotably connected to a lower arm 123 and a second end pivotably connected to an upper arm 134 of the linkage 130.

The linkage 130 has a cross beam 130a, lower arms 133, and upper arms 134. First parts of the upper arms 134 and of the lower arms 133 are pivotably connected to the connection 170. Second ends of the lower arms 133 and of the upper arms 134 are pivotably connected to the support 18.

The connections 170 have side plates 172 and cross structure 176.

The mount 141 has rollers 144 which are located to roll in channels 196 of a column 190. The column 190 is rotatable on a bearing R with respect to a stem B. A device (not shown) raises and lowers the mount 141 and thus the apparatus 100. It is within the scope of the present invention to use any suitable known device 200, which may reside within the column 190. In certain aspects, the device (not shown) employs a lifting cylinder apparatus, e.g. as shown in U.S. Pat. No. 7,249,639, incorporated fully herein for this purpose.

The mount 141 and the column 190 rotate with respect to the stem B. The linkages 110, 120, 130 are moved by extending piston shafts of hydraulic cylinder apparatuses 150 which are connected between a mount 141 on the support column 190 and connections on the lower arms 113. A piston 151 is movable in cylinder 152 to extend and retract the extension apparatus 100.

Figure 9:
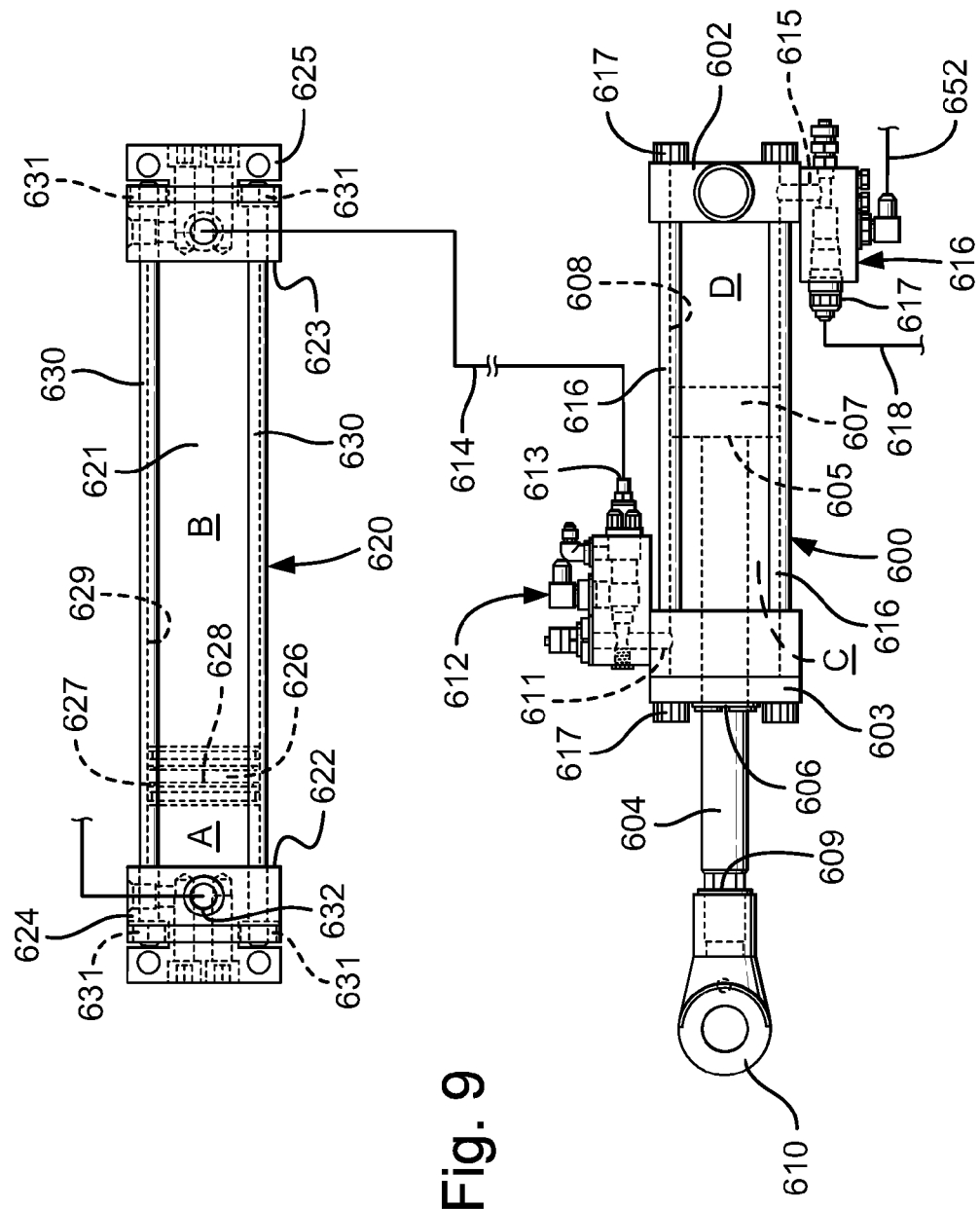
FIG. 9 is a schematic diagram, with some hidden parts shown in dashed lines, of a piston and cylinder and transfer barrier unit used in the apparatus shown in any of FIGS. 1 to 8.

The piston and cylinder 151,152 is hydraulically linked to a transfer barrier unit of the type described herein with reference to FIG. 9.

FIG. 1B shows the extension apparatus 100 fully retracted and fully lowered on the column 190 down to a rig floor RF. Arms 114 are parallel to arms 113; arms 124 are parallel to arms 123; and arms 134 are parallel to arms 133. The pistons 151 are fully retracted in their respective cylinders 152.

Several heights, lengths, and distances (for certain particular embodiments) are indicated by dual measurements in inches and in millimeters. For example, in FIG. 1B the entry "104.23" above the entry "[2647.53]" indicates the height indicated at that point is 104.23 inches and 2647.53 millimeters. As shown in FIG. 1I, the height H is 118.82 inches and 3018.06 millimeters (which is less than a height of 120 inches —which is the distance, in one aspect, from the rig floor RF to the bottom of ends E of rails M (shown partially) which are rails in the rig on which a top drive moves up and down.

Another example of an apparatus for positioning an iron roughneck, power tong or other connection apparatus is shown in FIGS. 2 to 6. The apparatus, which is generally identified by the reference numeral 200, comprises a piston and cylinder assembly 201 and a mounting assembly 202.

The piston and cylinder assembly 201 comprises a conventional two stage hydraulic piston and cylinder 203 which is mounted internally of a telescopic structure which comprises an outer barrel 204, an intermediate barrel 205 and an inner barrel 206.

The piston and cylinder 201 is hydraulically linked to a transfer barrier unit of the type described herein with reference to FIG. 9.

The inner barrel 206 is slidably mounted in the intermediate barrel 205 which is, in turn, slidably mounted in the outer barrel 204. The mounting assembly 202 comprises a bearer 207 which can be secured to a beam by two bolt and plate assemblies 208. The bearer 207 includes two ears 209 which accommodate trunnions 210 which project from either side of a carriage 211.

A clamp assembly 212 is bolted to the top of the carriage 211 and maintains the piston and cylinder assembly 201 in position with respect to the mounting assembly 202.

In use, the mounting assembly 202 is first secured to a convenient support beam in the drilling rig by bolt and plate assemblies 208. If necessary a support beam may be mounted in the drilling rig for this purpose. Alternatively the piston and cylinder assembly 201 may be mounted on a movable carriage on a column, similar to mount 141 on a column 190 shown in FIGS. 1A and 1B.

The piston and cylinder assembly 201 is then mounted on the carriage 211 and clamped in position. on a movable carriage on a column, similar to mount 141 on column 190 shown in Figures 1A and 1B.

A tong is then attached to the free end 213 of the piston and cylinder assembly 201 which is moved with respect to the mounting assembly 202 so that, at full extension, the tong is in the desired position with respect to well center.

In normal use the tong can be moved towards and away from well center by extending and retracting the hydraulic piston and cylinder 203. The outer barrel 204, intermediate barrel 205 and inner barrel 206 extend and contract with the hydraulic piston and cylinder 203 and provide lateral rigidity to the structure. At full extension the piston and cylinder assembly 201 can be deflected from side to side by a small amount. This movement can readily be accommodated by the two stage hydraulic piston and cylinder 103 although, if desired, the ends thereof could be mounted on, for example, ball and socket joints or resilient mountings.

It will be appreciated that when the piston and cylinder assembly 201 is fully retracted the free end 213 will lie immediately adjacent the extremity 214 of the outer barrel 204. For many purposes such retraction would be insufficient and consequently manipulation of tongs by piston and cylinder assemblies has heretofore been deemed untenable. The present invention provides a simple and elegant solution to the problem. In particular, the clamp assembly 212 can simply be slackened, the piston and cylinder 201 slid on the carriage 211 until the extremity 214 lies adjacent the mounting assembly 202 and the clamp assembly 212 re-tightened. When the piston and cylinder assembly 201 is fully contracted the free end 213 of the piston and cylinder assembly 201 lies closely adjacent the mounting assembly 202 with the tong therebelow. This can clearly be seen in FIG. 5.

It will be noted that the piston and cylinder assembly 201 lies on an upwardly extending axis and that a major portion of the piston and cylinder assembly 201 lies to the rear of the mounting assembly 202. It will be noted that in this position the tong rests on the workshop floor which simulates the drilling floor.

An alternative inoperative position is shown in FIG. 5. In this position the tong is suspended from an overhead cable whilst the piston and cylinder assembly 201 again lies along an upwardly extending axis.

For certain operations it may be desirable to remove the tong completely. In such a case the apparatus 100 can simply be parked in the inoperative position shown in FIG. 5 or FIG. 6. Preferably, a locking device is provided to ensure that the piston and cylinder assembly 101 remains in its parked position.

The apparatus 200 is preferably made of aluminium and is thus comparatively light and easy to handle. The apparatus 200 incorporates the control apparatus shown in FIG. 9 et seq.

Figure 8:
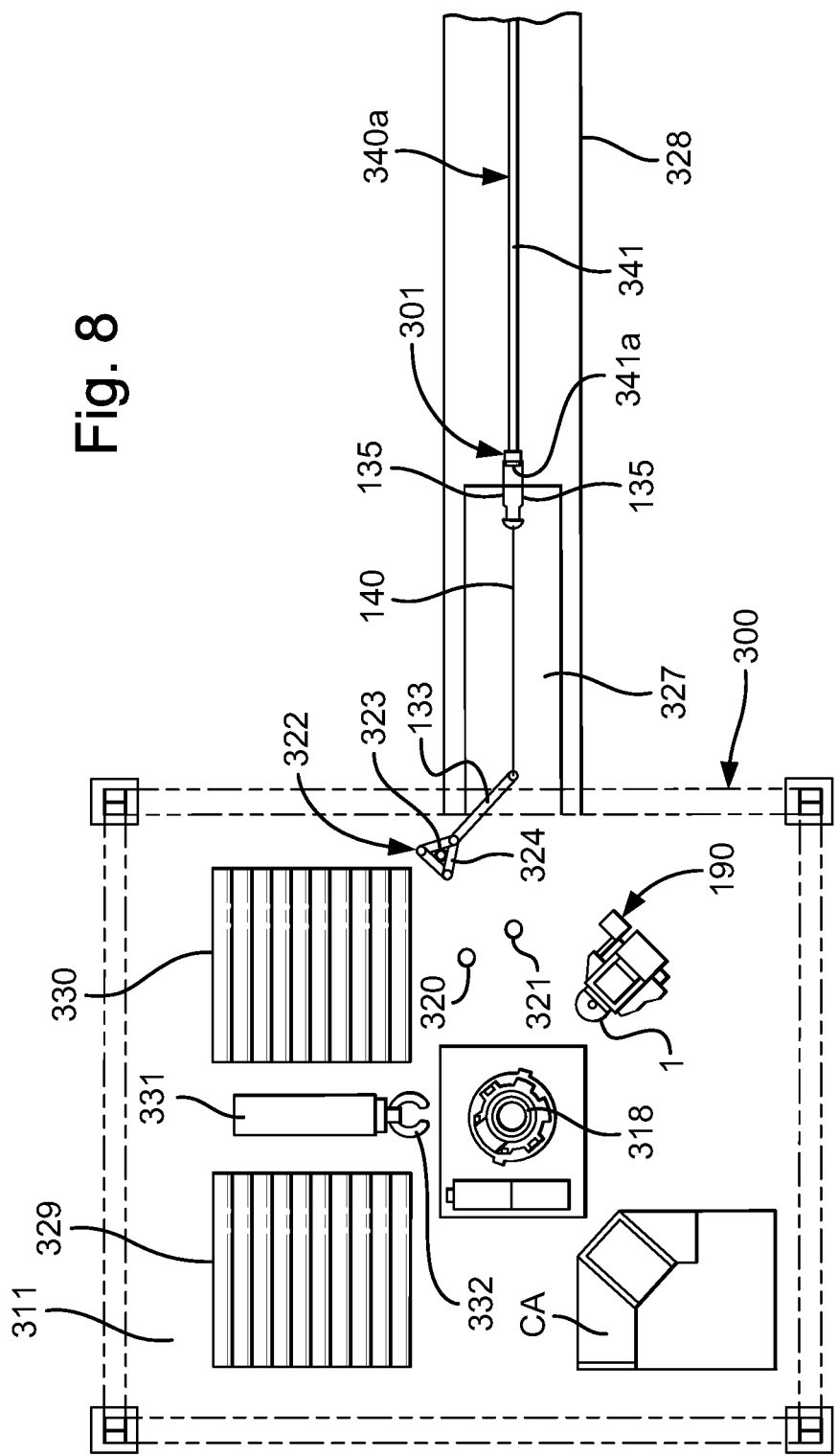
FIG. 8 is a schematic top view of the drilling rig shown in FIG. 7, with further parts shown and other parts not shown.

FIGS. 7 and 8 show schematically a drilling rig generally identified by reference numeral 300. The drilling rig 300 comprises a derrick 310 extending upwards from a drill floor or platform area 311. A drilling hoist comprising a travelling block and a swivel and hook assembly is mounted at the upper part of the derrick, but is not shown in the drawings for clarity. A top drive unit, is mounted on a carriage so as to be displaced along a vertically extending track, is suspended by the hoist in a manner known per se, which are not shown in the drawings for clarity. The drilling hoist and the top drive unit suspended thereby are substantially aligned with a drilling opening 318, known as the well-center, defined in the drill floor 311, and the top drive unit may be brought into rotary driving engagement with the upper end of a drill string 319 extending through the drilling opening 318.

Two assembling or preparation openings 320 and 321, known as mouse-holes, are defined in the drill floor 311 located in close proximity to the drilling opening 318. A pipe handling apparatus for loading drill pipe and preparing stands of drill pipe is generally identified by reference numeral 322. The pipe handling apparatus 322 comprises a vertically extending frame tower 323 and a slideable carriage 324, which may be referred to as a dolly, to which is arranged an elevator 1, such as the elevator 301. The pipe handling apparatus is provided in close proximity to the mouseholes 320 and 321 and an opening in the side of the derrick 310 known as a V-door 325 facilitates access to areas off the drill floor 311, including access to a ramp 327, known as a slide, and an area for storing pipes and an access way 328 for use in transferring the pipes from the storage areas to the platform 311, known as a catwalk.

The drill floor 311 may further comprise storage areas 329 and 330 arranged in setback areas within the confines of the derrick for storing stands of drill pipe, sections or stands of casing, parts of a bottom hole assembly and/or well tools in a vertical position, such storage areas as shown are conventional fingerboards. A pipe handling arm 331 for loading and unloading stands of pipe from the storage areas 329 and 330 comprising a rotatable and extendable gripping device 332 is mounted generally in the setback area preferably between the two storage areas and advantageously in the upper portion of the derrick and within the structure of the derrick 310 to provide for moving stands of pipe or sections of pipe between the well-center, stand building mouse-holes 320 and 321 and/or storage area 329 and 330. The pipe handling arm 331 is a robotic arm which can manipulate pipe at least two planes: vertical and horizontal, preferably a third plane and has a knuckle joint at a point close to the gripping device 332 for facilitating maintenance of the pipe in a vertical position, and but may be used to angle the pipe. The knuckle joint is able to orient the pipe in roll and pitch and preferably heave. Thus preferably, the arm can manipulate a pipe in all six degrees of freedom.

The drill floor further carries drawworks associated with the drilling hoist. A driller's cabin C is provided for the operator or driller to operate the pipe handling apparatus from and may be used to operate the connection equipment apparatus and positioner apparatus therefor.

The pipe handling apparatus 322 comprises a tower 323, which is slightly taller than three sections of drill pipe. A section of drill pipe is generally about 9.1 meters (30 feet) long and so the tower 323 would be at least 30 meters tall for handling stands of three sections of pipe, in another embodiment at least 20 meters tall for handling stands of two sections of drill pipe and at least 10 meters tall for handling one section of pipe. Sections of casing are generally not built into stands before being connected to the string of casing at the well center 318. However, sections of casing can be of various lengths and the tower may be built of any suitable height if such use is envisaged. Other tools may be handled using the pipe handling apparatus 322 including handling liner hanging tools and liner hanging tool strings and cleaning tools. Liner hanging tools comprise a long string of tools and may be constructed using the pipe handling apparatus and thus may require a taller tower of perhaps 40 or 50 meters in height. Bottom hole assemblies can also be put together in a similar way as that described herein, but the number of parts in a 27 m (90 feet) assembly may be different. For example, the process of making bottomhole assemblies (BHA) will typically start with the drill bit, which is brought in and placed in a so-called bit breaker on top of the preparation opening followed by a tubular, so-called BHA part, which is brought in and suspended from the load an preparation pipehandling device, so that the lower end is contacting the drill bit (not shown). The two parts are connected by the spinning and torquing device, such as iron roughneck 1 and then lifted out of the bit breaker. The bit breaker is removed and the interconnected two parts are lowered into the preparation opening and set in slips. From this point on, the stand is completed in the same way as other stands of drill collar sections, drill tube sections, stabilizers, centralizers, scratchers, drill bits, and other drill string or drill casing components as well as production tubing bodies may be assembled into tubular lengths, such as drill string and well casing stands (usually doubles or triples) and logging assemblies. The stands are prepared and may be transported to one of the storage areas 329, 330 for later use or moved directly to well center.

The pipe handling apparatus 322 comprises carriage 324 having an arm 333 mounted thereon. The carriage is arranged on wheels 334 which facilitate movement of the carriage up and down the tower 323. The carriage 324 does not rotate with respect to the tower 123. The tower is of triangular cross-section, but may be of any cross-section, such as square, circular, rectangular, pentagonal and oblong.

The tower 323 is arranged to be out of alignment with a direct path from the ramp 327 to the wellcenter 318. The tower 323 is mounted in lower and upper rotary platforms, so that the tower 323 can rotate about its longitudinal axis. The rotary platforms are driven by a hydraulic, pneumatic or electric motor and controlled from the operator or driller's cabin CA. The rotary tables are arranged on bearings (not shown), and the tower could be rotated manually.

In use, a section of drill pipe 340a is moved from a large storage area external the drilling platform and on to the catwalk 328 to lie substantially horizontally with the box end 341a having a female thread therein of the drill pipe 340a closest to the V-door 325 and the pin end furthest away from the V-door 325. The elevator 301 is fitted over the body 341 of the section of drill pipe 340a, which lies substantially horizontally on the catwalk 328.

A winch (not shown) is operated to wind the wireline 340 in to pull the elevator 301 and the drill pipe 340 in to the carriage 324 and up the tower 323. Once the section of drill pipe 340a is clear of the platform 311, the winch is stopped and the tower 323 is rotated on rotary tables by approximately 120 degrees, so that the section of drill pipe 340 is now in line with the first mousehole 320. The winch is operated to unwind the wireline 340 to lower the carriage 324 and the section of drill pipe 340 into the first mousehole 320, such that the box 341a is at approximately one to four meters and preferably one to two meters above the platform 311. Once the section of drill pipe 340a is in the first mousehole 320, slips in the mousehole (not shown) or an end stop, such as a scabbard, underneath the drill pipe (not shown) prevent the drill pipe 340a from falling through the drilling rig 300. A second section of drill pipe (not shown) is aligned with the first mousehole 321.

A spinning and torquing unit 10 known as an Iron Roughneck, such as the one sold by BJ Varco under the trade mark ST-100, is rotated about a column 190 into alignment with the first mouse-hole 320 and moved forward on the extendible arm 100 such that the spinning and torquing unit 10 engages the box of the first section of drill pipe and the pin end of the second section of drill pipe. The connection is made with the spinning and torquing unit 10, shown in FIG. 1A. Dope may be applied to the threads of the pin and/or box before the connection is made to make a stand of two sections of drill pipe, known as "a double".

The spinning and torquing unit 10 is retraced on arm 100 to a storage position. The winch is operated to wind the wireline 340 to lower the elevator 301 and the "double" in the first mousehole 320. The winch is then stopped, the elevator disconnected and the tower 323 is rotated to pick up a third section of drill pipe through the V-door 325. The spinning and torquing unit 10 is extended on arm 100 to engage the box of the second section of drill pipe and the pin end of the third section of drill pipe. The spinning and torquing unit 10 is activated to make-up the connection between the second and third sections of drill pipe to form a stand of three sections of drill pipe, known as a "triple". Dope may be applied to the threads of the pin and/or box before the connection is made.

The spinning and torquing unit 10 is retraced on arm 152 to a storage position, ready for making up a further stand of drill pipe, or to be used at the wellcenter 118. The winch is operated to wind the wireline 340 to lift the elevator 1 and the triple out of the first mousehole 320. The tower 323 may be rotated towards a raised platform situated at the top of the fingerboards 329 and 330, known as a stabbing board or monkey board on which a derrickman stands. A pipe handling arm 331, such as the one sold by BJ Varco under the trade name VCR, grabs the triple. The derrickman on the stabbing board removes the safety locking pin from the elevator 301 and pulls back on the handle to release the elevator from engagement with the triple. The pipe handling arm 331 holds and moves the triple into the fingerboard 329 or 330 for storage or may move the triple directly to the wellcenter 318 for connection to a string of drill pipe in the well. The spinning and torquing unit 10 is moved into alignment with the wellcenter 318 for "just-in-time" stand building operations and moved on extendible arm 100 into engagement with the drill pipes to make a connection with the drill string.

Drilling may be simultaneously conducted at the wellcenter 318 whilst preparation of a stand of pipe or a single is transferred from the catwalk 328 or ramp 127 to the wellcenter 318 and/or fingerboard, as described herein. Although, more often, a batch of stands is made and stored and then the stands are connected to the string in a separate operation. Thus the inventor has observed that it is important that the Iron roughneck is moved into and out of engagement with the sections of drill pipe to be connected at a one or other of the well-center and mouse-hole in a consistent manner.

FIG. 9 shows a piston and cylinder 600, such as piston and cylinder 151,152 shown in the apparatus shown in FIG. 1A and piston and cylinder 203 of the apparatus shown in FIGS. 2 to 6. The piston and cylinder 600 comprises a cylinder 601 having a rear cylinder head 602 and a front cylinder head 603 to define a hydraulic fluid tight cylinder. The rear cylinder head 602 and front cylinder head 603 have four bars 616 therebetween having threads at each end and nuts 617 to inhibit the cylinder heads 602, 603 from moving apart. A piston rod 604 is slideably arranged in a fluid tight opening 606 in the front cylinder head 603. The piston rod 604 has a proximal end 605 on which a piston head 607 is fixed or integrally formed therewith. The piston head 607 is slideably arranged within cylinder 601. One or more seals (not shown) is provided between the piston head 607 and inner wall 608 of the cylinder 601 to provide a hydraulic fluid tight seal. An eye bolt 610 is fixed on a distal end 609 of the piston rod, external to the cylinder 601. The eye bolt 610 facilitates attachment to another part of a connection equipment positioning apparatus 10, 200 to extend or retract an arm 100, 204,205,206 thereof.

The inner wall of the cylinder 608, front cylinder head 603, piston 607 and piston rod 604 define chamber C. A hydraulic fluid port 611 is provided in front cylinder head 603 which is in fluid communication with a load holding valve 612 attached to the cylinder 601. The load holding valve has a transfer port 613 connected to a hydraulic fluid line 614 to provide hydraulic fluid communication with chamber C. The inner wall of the cylinder 608, rear cylinder head 602 and piston 607 define chamber D. A hydraulic fluid port 615 is provided behind cylinder head 603 which is in fluid communication with a load holding valve 616 attached to the cylinder 601. The load holding valve 616 has a transfer port 617 connected to a hydraulic fluid line 618 to provide hydraulic fluid communication with chamber D.

A hydraulic transfer barrier unit 620 has a cylinder 621 of preferably, but not exclusively of circular cross-section. The cylinder 621 has first and second ends 622 and 623, each provided with a respective first and second cylinder head 624 and 625 to provide a hydraulic fluid tight cylinder. The cylinder heads 624, 625 have four bars 630 therebetween having threads at each end and nuts 631 thereon to inhibit the cylinder heads 602, 603 from moving apart. A floating piston 626 is slideably arranged within the cylinder 621. One or more seals 627 are arranged in recesses 628 milled or otherwise formed in the piston 626 and abut inner wall 629 of the cylinder 621. The floating piston 626 provides a fluid tight seal between chambers A and B. Chamber A is defined by the inner wall 629 of the cylinder 621, first cylinder head 624 and the floating piston 626. Chamber B is defined by the inner wall 629 of the cylinder 621, second cylinder head 625 and the floating piston 626. A hydraulic fluid inlet 632 is provided in the first cylinder head 624. Hydraulic fluid line 614 is connected to the first cylinder head 624.

Figure 10A:
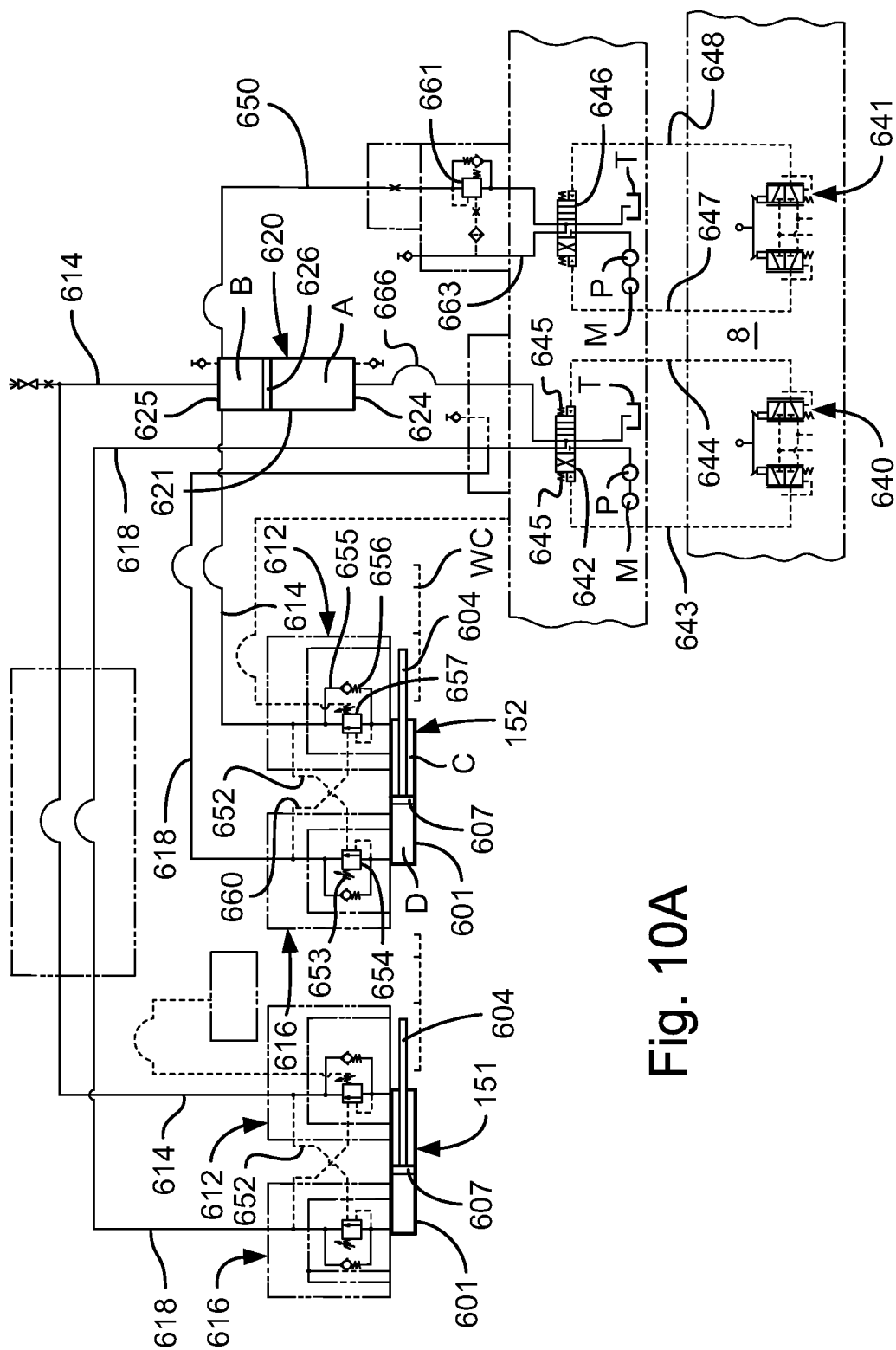
FIGS. 10A to 10E show a schematic of a hydraulic circuit incorporating two piston and cylinders and a transfer barrier shown in FIG. 9, in various stages during a set-up procedure.

FIG. 10A is a schematic of a hydraulic circuit incorporating two such piston and cylinders 151, 152 and a transfer barrier unit 620 shown in FIG. 9, wherein position of the pistons 607 relative to the cylinders 601 and a floating piston 626 of the transfer barrier 620 are arbitrary.

The hydraulic circuit has a three position deploy lever 640, the positions being: EXTEND, to extend the piston rod 604 from the cylinder 601 and thus extend the positioning arm 100; RETRACT, to retract the piston rod 604 from the cylinder 601 and thus retract the positioning arm 100; and NEUTRAL, in which the piston is prevented from moving in the cylinder by a hydraulic lock, and thus the arm 100 is fixed in a position.

The hydraulic circuit has a three position adjust lever 641, the positions being: RETRACT TO RESET, to retract the piston rod 604 from the cylinder 601 and thus retract the positioning arm 100 to a stowed position and to move the free floating piston to the cylinder head 622; NEUTRAL, in which the free floating piston 626 is hydraulically locked in a longitudinal position in the transfer barrier cylinder 621; and EXTEND TO SET, to move the free floating piston 626 toward the cylinder head 622 when the positioning arm 100 is at a required extension, for example at well-center, a mouse-hole or rat-hole.

The deploy lever 640 and adjust lever 641 may be found on control panel 8 on the distal end of the arm 100, or at another location, such as in the driller's cabin CA. Advantageously, the deploy lever 640 and preferably the adjust lever 641 are provided with means for self-centering to the NEUTRAL settings. Self-centering may be carried out with, for example, hydraulics, pneumatics, springs or other resilient means. Moving the deploy lever 640 between settings controls a deploy control valve 642. The deploy control valve 642 has two ways, and three positions to reflect the three setting deploy lever 640. The deploy control valve 640 changes position by flowing hydraulic or pneumatic fluid under pressure through one of flow paths 643 and 644 to overcome flow pressure from the other, which is preferably left opened to tank and thus easily overcome. The flow of hydraulic or pneumatic fluid through flow paths 643 and 644 is controlled by action of the deploy lever 640. Alternatively, electric means such as using a solenoids or a stepper motor could be used to move the deploy control valve 642 between the three positions, although electrical means is not preferred near well-center due to inter alia the possibility of inducing explosions. Springs 645 are arranged on either side of the control valve to assist with self-centering to the NEUTRAL setting.

Moving the adjust lever 641 between settings controls an adjust control valve 646. The adjust control valve 646 has two ways, and three positions to reflect the three setting adjust lever 641. The adjust control valve 646 changes position by flowing hydraulic or pneumatic fluid under pressure through one of flow paths 647 and 648 to overcome flow pressure from the other, which is preferably left opened to tank and thus easily overcome. The flow of hydraulic or pneumatic fluid through flow paths 647 and 648 is controlled by action of the adjust lever 641. Alternatively, electric means such as using a solenoids or a stepper motor could be used to move the adjust control valve 646 between the three positions, although electrical means is not preferred near well-center due to inter alia the possibility of inducing explosions. Springs 645 are arranged on either side of the control valve to assist with self-centering to the NEUTRAL setting.

Referring to FIGS. 1A and 1B, in operation, the connection equipment, such as an iron roughneck 1 is placed on to the distal end of the positioning arm 100.

When the positioning arm 100 has been used, the positioning arm 100 may be partially extended and the position of the free floating piston 626 within the hydraulic transfer barrier cylinder 621 may not be known. Thus, a reset procedure is carried out. The reset procedure comprises the steps of the operator holding the adjust lever 641 in the RETRACT TO RESET setting. The adjust control valve 646 assumes the position shown in FIG. 10B. Hydraulic fluid flows under pressure provided by a pump P driven by motor M through the control valve 646, through flow line 650 into the hydraulic transfer barrier cylinder 620 through the second cylinder head 625. The hydraulic fluid pressure in chamber B overcomes the hydraulic pressure in chamber A, moving the free floating piston 626 toward the first cylinder head 622 whereupon the hydraulic fluid in chamber A is pushed through flow line 651, through deploy control valve 642 to tank T. Hydraulic fluid is also allowed to pass from hydraulic transfer barrier 620 through flow lines 614 through loading holding valves 612 into chambers C of the piston and cylinders 151 and 152. Hydraulic fluid is allowed to pass through the load holding valves 612, and into a pilot signal line 652 which overcomes spring 653 and opens slide valve 654. The fluid pressure in flow line 614 also flows through pilot signal line 655, overcoming resilient ball valve 656 and opening slide valve 657 allowing hydraulic fluid to flow into chamber C to retract the piston rods 604 to a fully retracted position. The operator holds the adjust lever open for about 90 seconds after the piston rods 604 are fully retracted to ensure free floating piston 626 in the hydraulic barrier unit 621 has bottomed out on the first cylinder head 624.

Figure 10B:
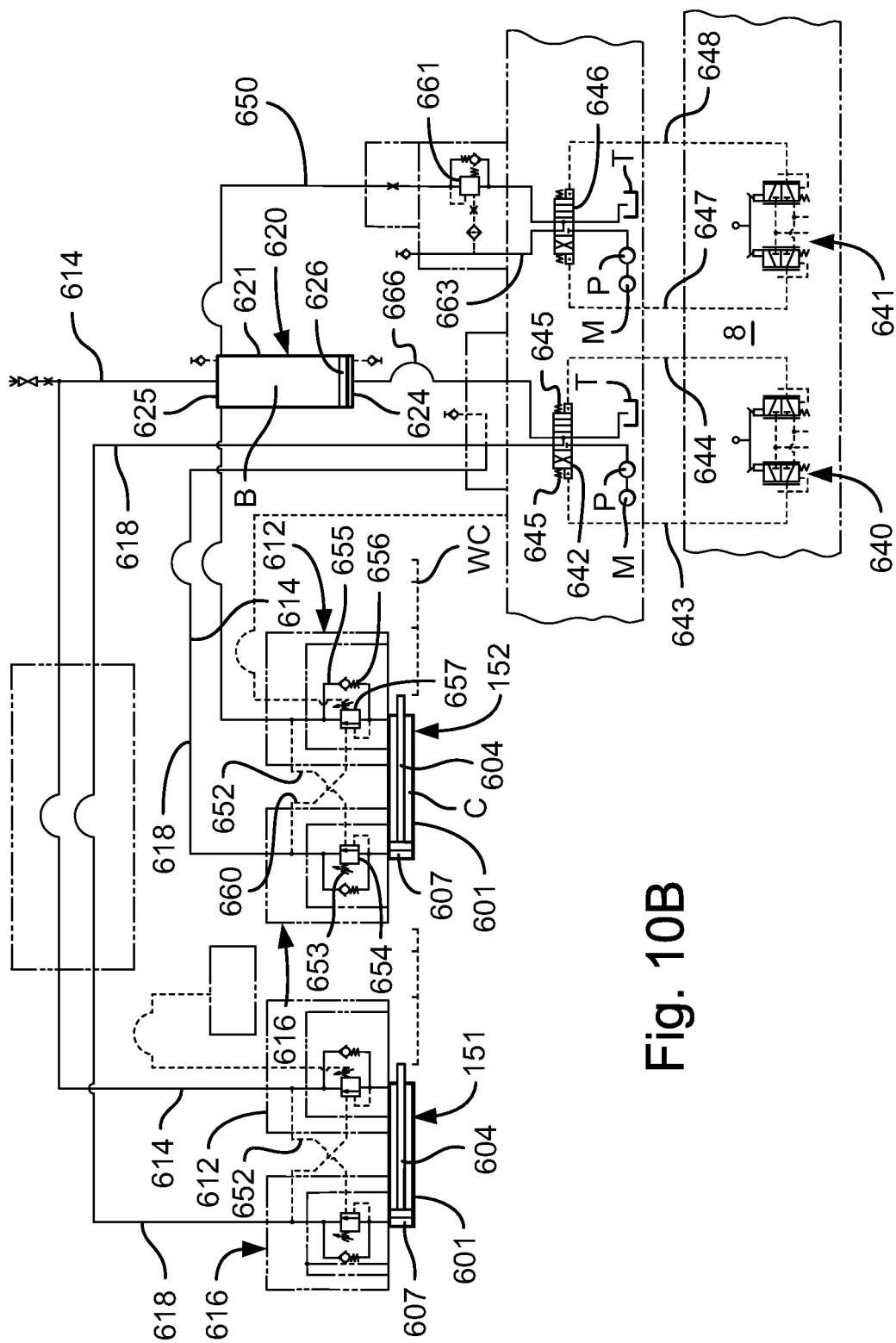

Thus FIG. 10B shows the hydraulic circuit shown in FIG. 10A with the pistons 607 and piston rods 604 thereof in a fully retracted position and the floating piston 626 bottomed out against cylinder head 622 in the transfer barrier cylinder 621 of the transfer barrier unit 620, the operator having held the adjust lever 641 in RETRACT TO RESET setting.

Figure 10C:
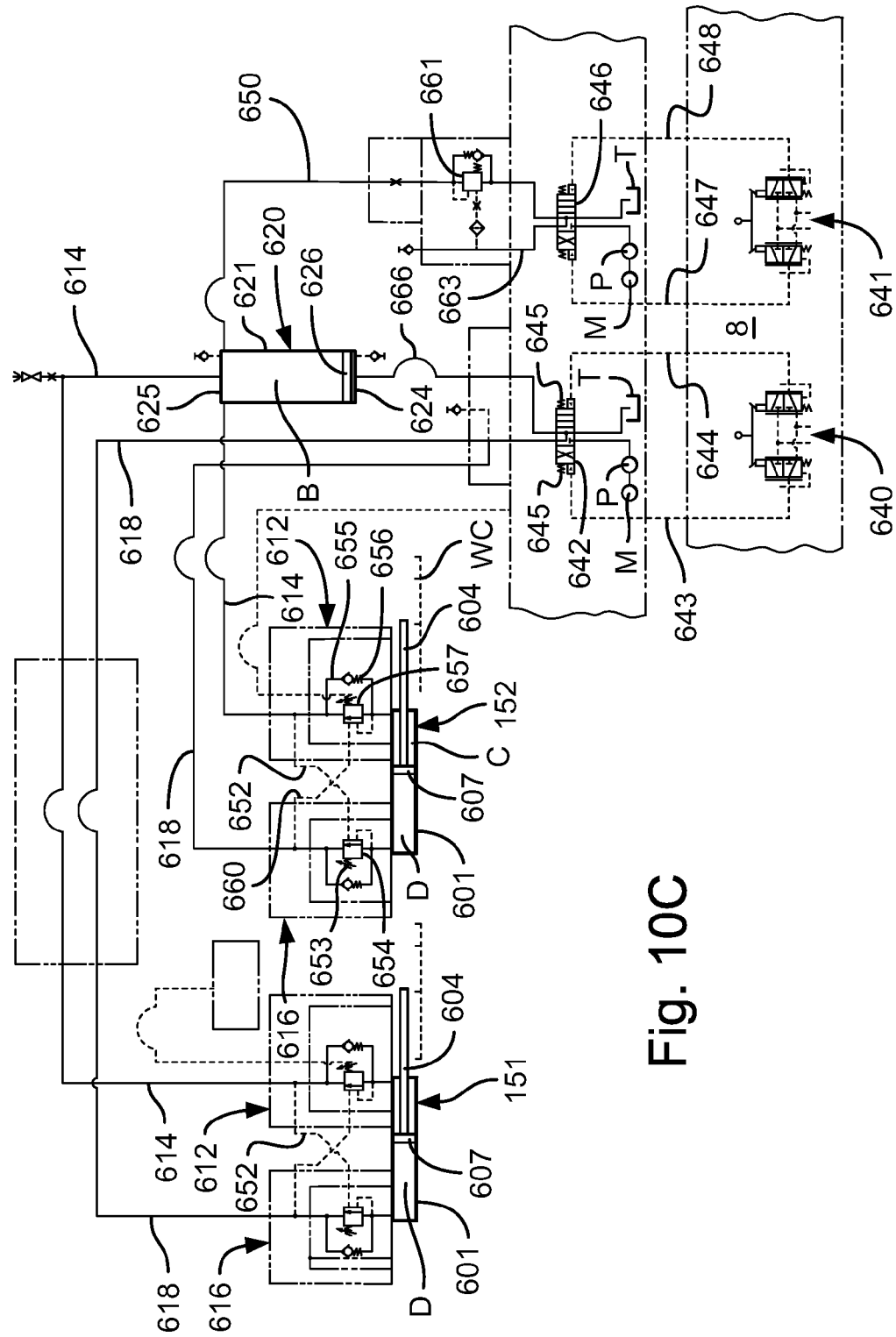

FIG. 10C shows the hydraulic circuit shown in FIG. 10A with the piston 607 and piston rod 604 thereof in a partially extended position and the floating piston 626 bottomed out in the transfer barrier cylinder 621, the operator holding the deploy lever 640 in the EXTEND setting and the adjust lever 641 in the EXTEND TO SET setting.

Hydraulic fluid pressurized by pump P driven by motor M flows through flow lines 618, through load holding valves 616 into chambers D. The pressurized hydraulic fluid in the lines 618 pressurizes hydraulic fluid in pilot lines 658 overcoming resilient ball valve 659 opening slide valve 654, allowing hydraulic fluid to flow through the load holding valve 616 into chamber D, extending piston rod 604. Thus load holding valve 616 is "piloted open".

Hydraulic fluid flows from chamber C through load holding valve 612. Hydraulic pressure in flow line 618 pressurizes hydraulic fluid in pilot line 660 to open slide valve 657 to allow the hydraulic fluid from chamber C to flow through the load holding valve 612. The hydraulic fluid from chamber C continues to flow through into chamber B of the hydraulic transfer barrier 620 and out through flow line 650, through adjust control valve 646 into tank T. Slide valve 661 is held open by pressure applied through adjust control valve 646, through line 663 via a diaphragm 662 pushing the slide valve 661 open.

Load holding valves 612 and 616 inhibit hydraulic fluid from flowing out of the chambers C and D when there is no or little pressure in flow lines 614 and 618, for example, when the deploy and adjust controls 640 and 641 are in NEUTRAL. When there is a high pressure, being the pressure produced by pump P when it is required to stroke the piston rod 604, pressure in pilot lines 652 or 660 slides slide valves 654 or 657 to allow hydraulic fluid in the other chamber C and D to escape.

Figure 10D:
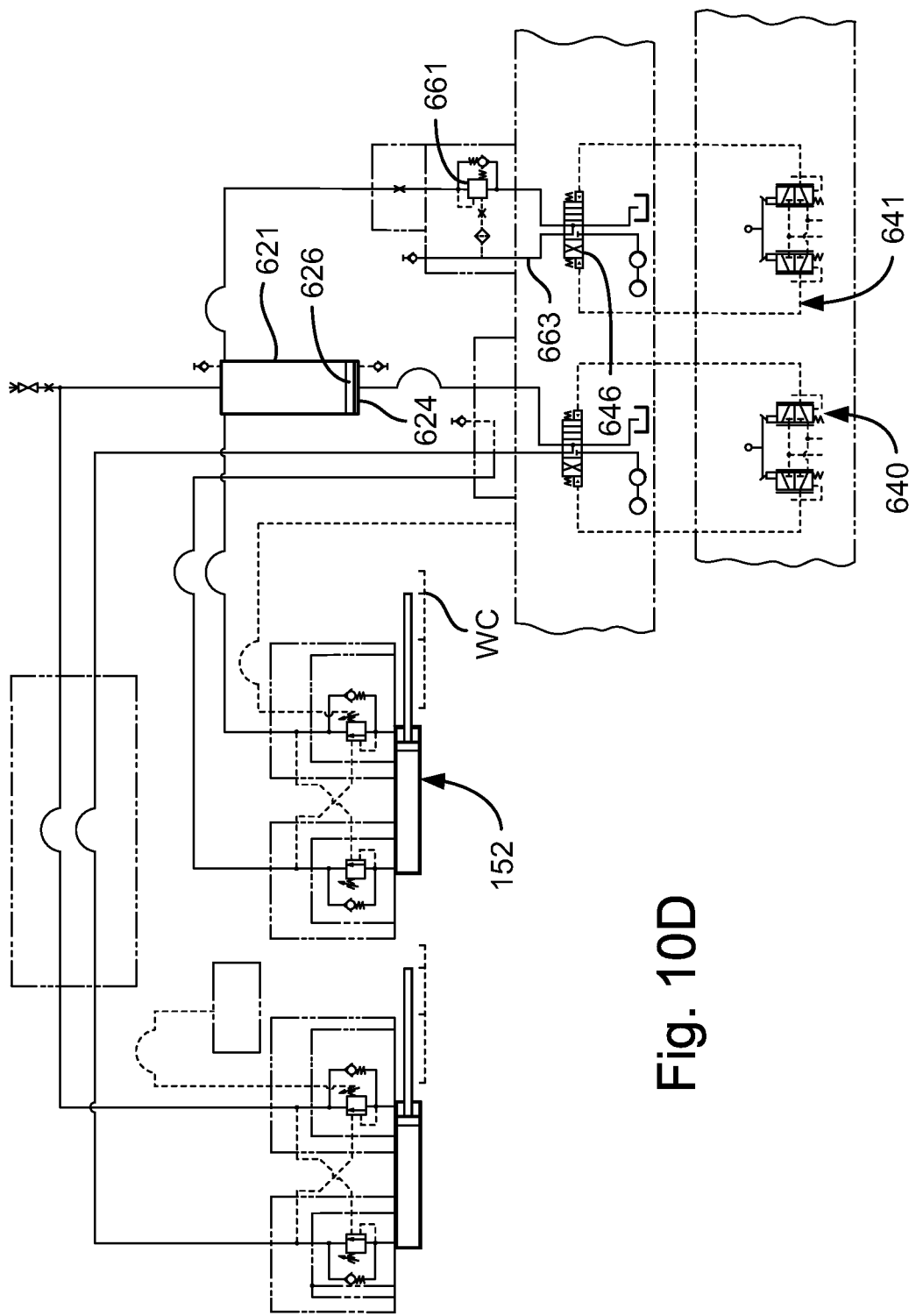

FIG. 10D shows the hydraulic circuit shown in FIG. 10A with the piston 607 and piston rod 604 thereof in a partially extended to a position WC at which connection equipment 1 held by the positioning apparatus 10 is noted by the operator to be in position at well-center at which point the operator releases the adjust lever 641 to NEUTRAL whereupon the floating piston 626 remains bottomed out in the transfer barrier cylinder 621 and flow of hydraulic fluid through line 663 flows to tank T, closing slide valve 661 and thus the piston rod 604 cannot extend further, prevent from moving as the free floating piston 626 creates a hydraulic lock.

Figure 10E:
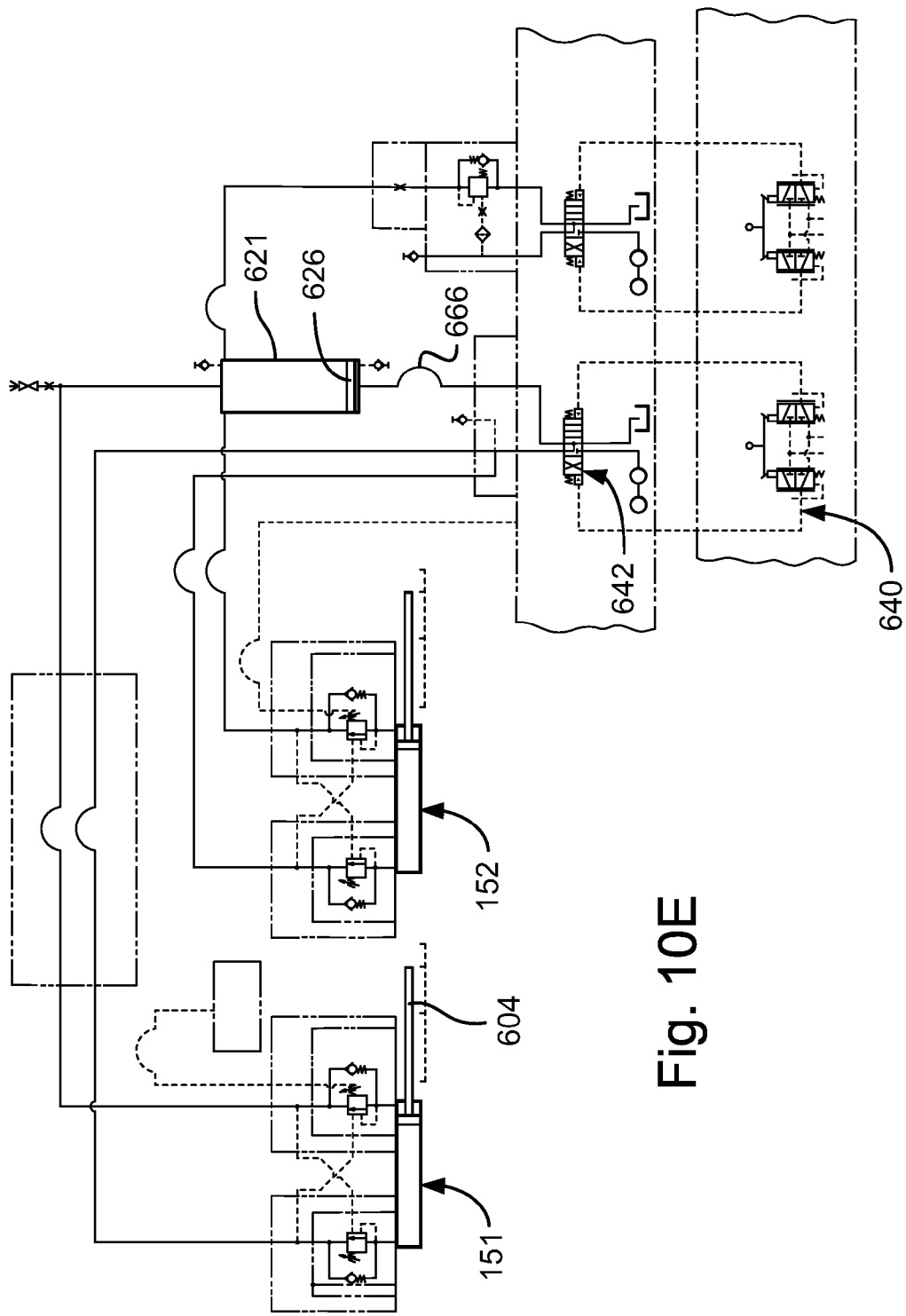

The operator then moves the deploy lever 640 to NEUTRAL, as shown in FIG. 10E.

The operator can now use the RETRACT settings on the deploy lever 640 to retract the connection apparatus from well-center. In so doing, hydraulic fluid flows from pump P through flow line 666 into chamber A of the hydraulic transfer barrier, moving the free floating piston 626 along the transfer barrier cylinder 621 towards the second cylinder head 625 squeaking hydraulic fluid from chamber B into flow lines 614, overcoming load holding valve 612 and entering chamber C to retract piston 607 and piston rod 604. Fluid from chamber D will flow through open load holding valve 616, through control valve 642 to tank T. The positioning arm 100 will be in the fully retracted position when the free floating piston 626 abuts the second cylinder head 625. When required, the operator holds the deploy lever 640 in the EXTEND setting until the free floating piston 626 abuts the first cylinder head 624 at which point the positioning arm 100 can move no further, knowing that that point will align the connection apparatus exactly at well-center.

Figure 11:
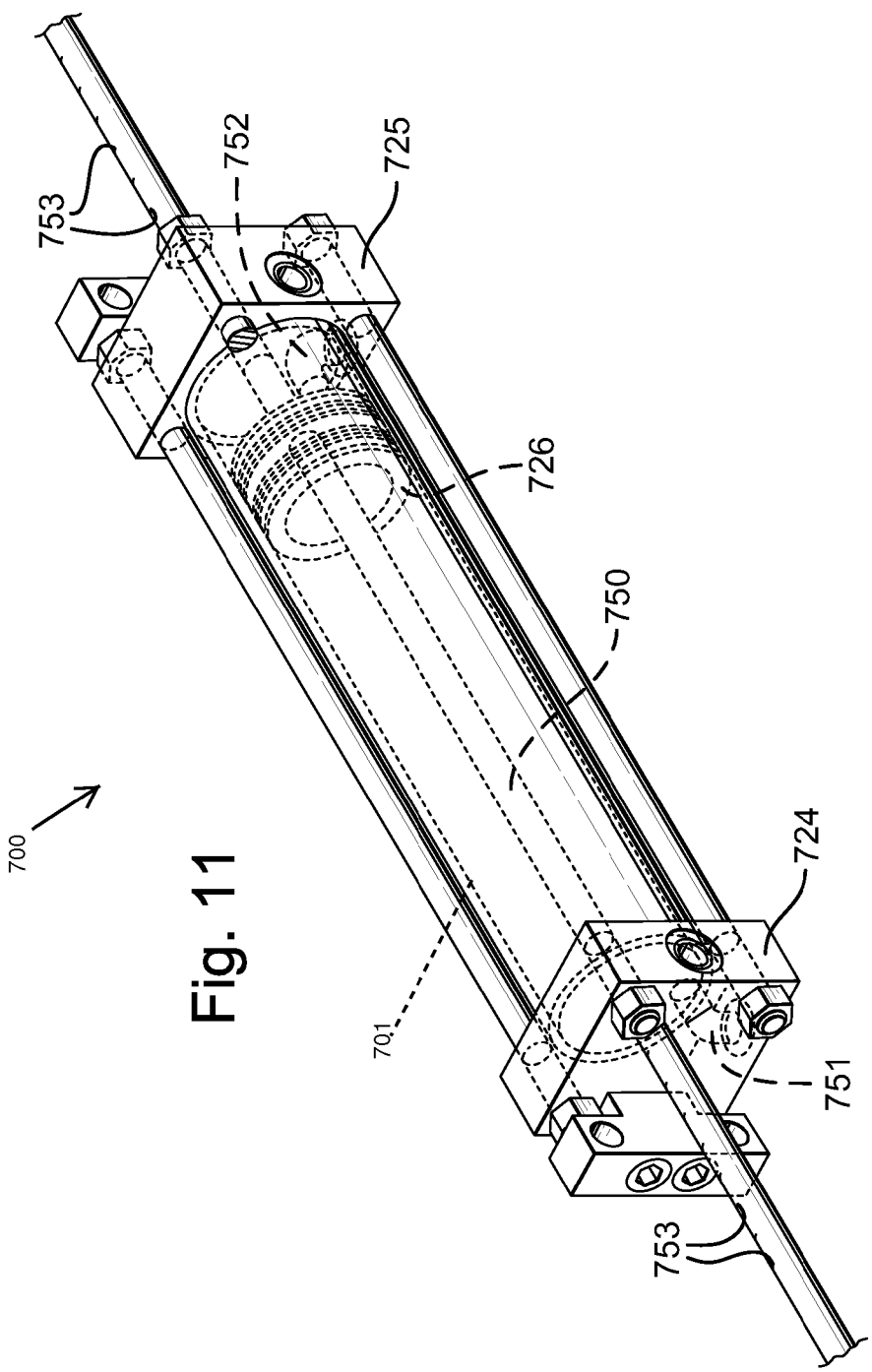
FIG. 11 shows a further embodiment of a transfer barrier for use in an apparatus of the present invention.

FIG. 11 shows a further embodiment of a transfer barrier unit 700 generally similar to the transfer barrier unit 600 of FIG. 9, but for a rod 750 passing through transfer barrier cylinder 701, and through fluid tight openings 751 and 752 in first and second cylinder heads 724,725. The rod 750 is fixed to the floating piston 726. Marks 753 along the rod 750 to indicate where the floating piston 726 is along the length of the cylinder 701. This can facilitate position for well-center and then positioning for operations at a mouse-hole.

Figure 12:
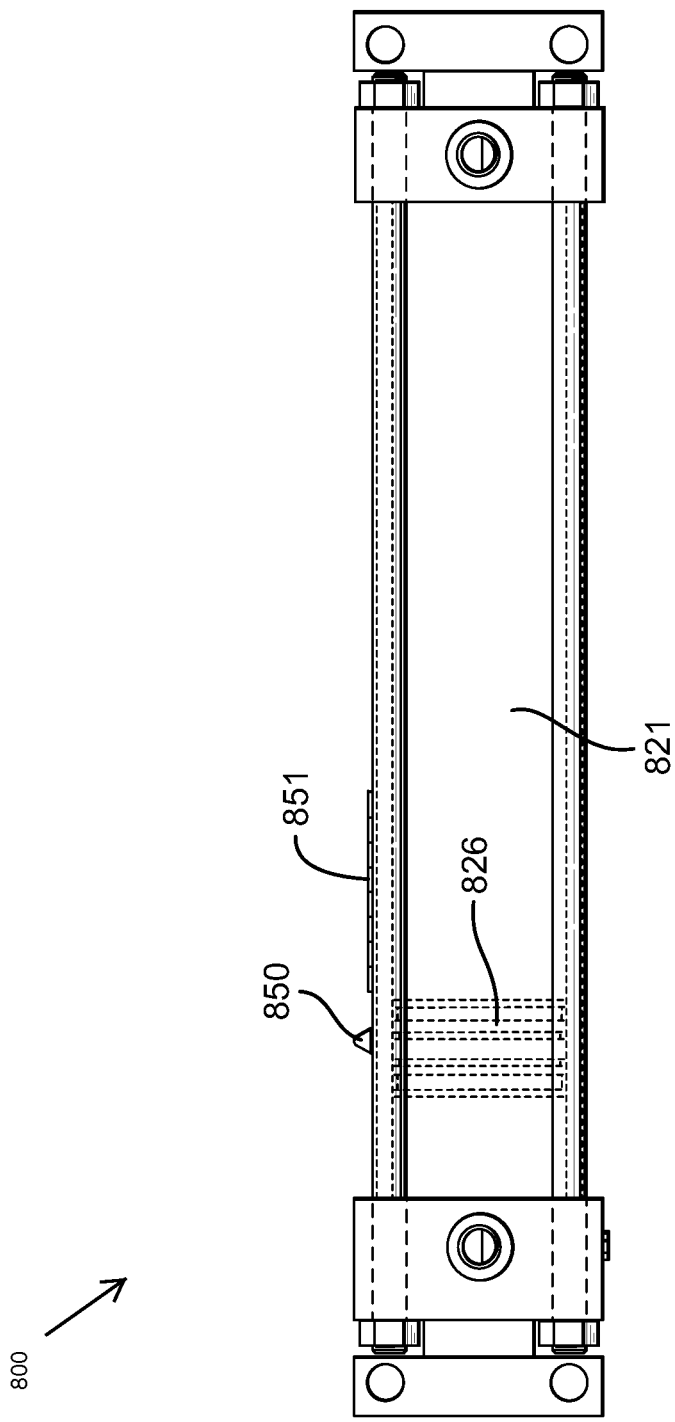
FIG. 12 shows a yet further embodiment of a transfer barrier for use in an apparatus of the present invention.

FIG. 12 shows a transfer barrier unit 800 generally similar to the transfer barrier unit 600 of FIG. 9, but for the floating piston 826 being magnetic or magnetizable. A magnetic indicator 850 indicates where the floating piston 826 along the length of the cylinder 821. A scale 851 is provided on an outer wall of the cylinder 821 floating piston 826 and using a magnet or electromagnetic coil (not shown) along the outside of the cylinder 821. An example of how the floating piston is moved is by having a fluid tight slot along the length of the cylinder 821 with a spigot projecting from the floating piston 626 through to the outside of the cylinder 821 which can be seen by an operator. Alternatively, a hall-effect transducer may be used external or internal to the cylinder 821 to detect the position of the magnetized free floating piston 826, such a hall-effect transducer may be a Linear Displacement Transducer. However, these use electricity and thus are difficult to use in hazardous areas liable to explosions.

This system is comprised of a hydraulic cylinder and transfer barrier. It may be comprised of several hydraulic cylinders and a transfer barrier depending on the application. The system works as follows:

In certain embodiments of an apparatus in accordance with the present invention, a reach of the positioning arm is provided at about 3.6 m (twelve feet). In certain embodiments, the vertical height of the spinner/wrench combination varies insignificantly as the apparatus is extended and retracted, e.g. in certain aspects only plus or minus 2 cm (0.75 inches) or less. With respect to embodiments as shown in FIG. 1A, if the piston/cylinder apparatuses fail, the apparatus will not abruptly extend or retract and it will not fall.

In certain aspects, in certain rigs with a top drive apparatus, a top drive moves up and down on rails connected to the rig structure. These rails have bottom ends a certain distance above a rig floor (e.g., in one particular aspect, 3 m (120 inches) above a rig floor). It is advantageous for an apparatus like the apparatus 10 with an extension apparatus 100 to project upwardly in the rig no further than immediately below the bottom of these rails. Certain embodiments in accordance with the present invention (e.g. as in FIG. 1A) in a fully raised position are less than 3 m (120 inches) above a rig floor on a rig with rails whose bottoms are 3 m (120 inches) above the rig floor.

The invention claiimed is:

1. A positioning apparatus for moving connection equipment on a drilling rig, the positioning apparatus comprising
    a piston and cylinder assembly comprising a cylinder, a piston and a piston rod, the piston operatively connectable to the connection equipment on the drilling rig, the piston and the piston rod moveable relative to the cylinder from a retracted position to an extended position; and
    a transfer barrier linked to the piston and cylinder assembly for controlling extension of said piston rod and thereby movement of the connection equipment, and wherein the transfer barrier comprises a free floating piston slideably arranged in a transfer barrier cylinder.

2. The positioning apparatus as claimed in claim 1, wherein said piston and cylinder assembly further comprises a first cylinder head and said cylinder has a bore, a first chamber defined by said first cylinder head, said bore and said piston, and a flow path between said first chamber and said transfer barrier to provide fluid communication between said first chamber and said transfer barrier.

3. The positioning apparatus as claimed in claim 2, wherein said first chamber is also defined by said piston rod.

4. The positioning apparatus as claimed in claim 3, wherein the cylinder has a second cylinder head, a second chamber is defined by said second cylinder head, said bore and said piston head, and a power fluid flow line to provide fluid under pressure to move said piston.

5. The positioning apparatus as claimed in claim 4, further comprising a load holding valve for selectively retaining fluid in said second chamber.

6. The positioning apparatus as claimed in claim 4, further comprising a deploy control valve for selectively providing fluid to said power fluid flow line for providing fluid to said second chamber.

7. The positioning apparatus as claimed in claim 4, wherein the fluid is hydraulic fluid.

8. The positioning apparatus as claimed in claim 2, further comprising a load holding valve for selectively retaining fluid in said first chamber.

9. The positioning apparatus as claimed in claim 1, wherein said transfer barrier further comprises a first cylinder head, said transfer barrier cylinder having a bore and a first transfer barrier chamber defined by said first cylinder head, said free floating piston, and said transfer barrier cylinder bore, said first transfer barrier chamber in fluid communication with said flow path.

10. The positioning apparatus as claimed in claim 9, further comprising a power fluid flow path for providing the first transfer barrier chamber with fluid.

11. The positioning apparatus as claimed in claim 10, further comprising a slide valve in said power fluid flow path to selectively inhibit flow of fluid along said power fluid flow path.

12. The positioning apparatus as claimed in claim 10, further comprising an adjust control valve for selectively providing fluid to said power fluid flow path for providing fluid to said first transfer barrier chamber.

13. The positioning apparatus as claimed in claim 9, wherein transfer barrier further comprises a second cylinder head, a second transfer barrier chamber defined by said second cylinder head, said free floating piston, and said transfer barrier cylinder bore, and a power flow path for selectively supplying fluid to said transfer barrier cylinder bore and draining from said transfer barrier cylinder bore.

14. The positioning apparatus as claimed in claim 13, wherein flow of fluid through said power flow path is selectively controlled by deploy control valve.

15. The positioning apparatus as claimed claim 1, wherein the positioning apparatus comprises one of: a foldable arm; and a telescopic arm.

16. A method for positioning connection equipment for connecting tubulars and moving the positioning equipment therefrom, comprising:

providing a positioning apparatus, comprising :

a piston and cylinder assembly having a cylinder, a piston and a piston rod, the piston operatively connectable to the connection equipment on the drilling rig, the piston and the piston rod moveable relative to the cylinder from a retracted position to an extended position; and a transfer barrier linked to the piston and cylinder assembly for controlling extension of said piston rod; and setting a maximum extension position of said piston rod and thereby movement of the connection equipment with the transfer barrier.

* * * * *